US010469479B2

(12) United States Patent
Appiah et al.

(10) Patent No.: US 10,469,479 B2
(45) Date of Patent: Nov. 5, 2019

(54) CROSS CLOUD TENANT DISCOVERY

(71) Applicant: Microsoft Technology Licensing, LLC, Redmond, WA (US)

(72) Inventors: Madan Mohan R. Appiah, Redmond, WA (US); Ganesh Kumar Panchanathan, Redmond, WA (US); Maciej Jacek Cupial, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 143 days.

(21) Appl. No.: 15/621,993

(22) Filed: Jun. 13, 2017

(65) Prior Publication Data
US 2018/0359242 A1    Dec. 13, 2018

(51) Int. Cl.
*H04L 29/00*      (2006.01)
*H04L 29/06*      (2006.01)
(Continued)

(52) U.S. Cl.
CPC ........ *H04L 63/0815* (2013.01); *G06F 9/4451* (2013.01); *G06F 21/335* (2013.01);
(Continued)

(58) Field of Classification Search
CPC ........... G06F 3/011; G06F 3/005; G06F 3/017
See application file for complete search history.

(56) References Cited

U.S. PATENT DOCUMENTS 8,364,819 B2   1/2013  Ferris et al.
8,607,350 B2  12/2013  Agrawal et al.
(Continued)

FOREIGN PATENT DOCUMENTS

CN   105429995 A   3/2016

OTHER PUBLICATIONS

"Your Domain in the Cloud Azure Active Directory Domain Services", Retrieved From: https://www.skylinetechnologies.com/Blog/Skyline-Blog/January_2017/Your_Domain_in_the_Cloud_with_Azure_Active_Directo, Jan. 6, 2017, 10 Pages.
(Continued)

*Primary Examiner* — Ghazal B Shehni
(74) *Attorney, Agent, or Firm* — Workman Nydegger

(57) ABSTRACT

A computer-implemented method for a security endpoint of a non-isolated computing environment includes receiving a request related to a non-isolated application. The method includes querying a directory service according to a domain name of a user specified in the request. The directory service stores a mapping between domain names and computing environments, including isolated computing environments and the non-isolated computing environment. The method includes receiving, from the directory service, an indication of a first computing environment. The method includes generating and sending a response to allow the user to be authenticated to the application. In response to the first computing environment being the non-isolated computing environments, the response indicates that the user belongs to the non-isolated computing environment. In response to the first computing environment being one of the isolated computing environments, the response indicates that the user does not belong to the non-isolated computing environment.

20 Claims, 18 Drawing Sheets

(51) Int. Cl.

| | |
|---|---|
| *G06F 21/62* | (2013.01) |
| *G06F 9/445* | (2018.01) |
| *G06F 21/33* | (2013.01) |
| *G06F 21/41* | (2013.01) |
| *G06F 21/53* | (2013.01) |
| *H04W 12/06* | (2009.01) |
| *H04L 29/08* | (2006.01) |
| *H04L 29/12* | (2006.01) |

(52) U.S. Cl.
CPC .............. *G06F 21/41* (2013.01); *G06F 21/53* (2013.01); *G06F 21/62* (2013.01); *G06F 21/6218* (2013.01); *H04L 63/0807* (2013.01); *H04L 63/104* (2013.01); *H04L 63/107* (2013.01); *H04L 67/18* (2013.01); *H04W 12/06* (2013.01); *H04L 61/1552* (2013.01); *H04L 63/20* (2013.01); *H04L 67/10* (2013.01)

(56) References Cited

U.S. PATENT DOCUMENTS

| | | | |
|---|---|---|---|
| 9,069,979 | B2 * | 6/2015 | Srinivasan .............. G06F 21/62 |
| 9,165,154 | B2 | 10/2015 | Auradkar et al. |
| 9,250,941 | B2 | 2/2016 | Kempf et al. |
| 9,276,869 | B2 | 3/2016 | Dodd et al. |
| 9,407,628 | B2 | 8/2016 | Sondhi et al. |
| 9,509,698 | B2 | 11/2016 | He et al. |
| 9,672,380 | B2 | 6/2017 | Rosenberg et al. |
| 2013/0091557 | A1 | 4/2013 | Gurrapu |
| 2014/0280595 | A1 | 9/2014 | Mani et al. |
| 2015/0229629 | A1 | 8/2015 | Ishaya et al. |
| 2016/0352779 | A1 | 12/2016 | Bergeson et al. |
| 2017/0006119 | A1 | 1/2017 | Pogrebinsky et al. |
| 2017/0048252 | A1 | 2/2017 | Straub et al. |
| 2017/0257215 | A1 * | 9/2017 | Huang ................ H04L 67/1097 |
| 2018/0359238 | A1 | 12/2018 | Appiah et al. |

OTHER PUBLICATIONS

"International Search Report and Written Opinion Issued in PCT Application No. PCT/US2018/035233", dated Sep. 14, 2018, 11 Pages.

U.S. Appl. No. 15/622,005, filed Jun. 13, 2017, Madan Mohan R. Appiah.

"Managing Infrastructure and Inventory", https://access.redhat.com/documentation/en-us/red_hat_cloudforms/4.2/html-single/managing_infrastructure_and_inventory/, Retrieved on: Feb. 22, 2017, 73 pages.

Pustchi, Navid, "Authorization Federation in Multi-Tenant Multi-Cloud IaaS", http://www.profsandhu.com/cs6393_s16/L8-2.pdf, Retrieved on: Feb. 21, 2017, 1-39 pages.

Federated authentication—Background, https://developers.exlibrisgroup.com/alma/integrations/user-management/authentication/introduction, Retrieved on: Feb. 21, 2017, 2 pages.

Craddock, John, "Mastering Identity with Azure Active Directory—Episode 2: It's all about protocols", https://blogs.technet.microsoft.com/uktechnet/2016/10/25/mastering-identity-with-azure-active-directory-episode-2-its-all-about-protocols/, Published on: Oct. 25, 2016, 6 pages.

Perkins, Benjamin, "Using Cloud Explorer with a Sovereign Cloud", https://blogs.msdn.microsoft.com/benjaminperkins/2017/01/09/using-cloud-explorer-with-a-sovereign-cloud/, Published on: Jan. 9, 2017, 7 pages.

Wasson, et al., "Securing a backend web API in a multitenant application", https://docs.microsoft.com/en-us/azure/guidance/guidance-multitenant-identity-web-api, Published on: Feb. 6, 2016, 9 pages.

Zhai, et al., "CQSTR: Securing Cross-Tenant Applications with Cloud Containers", In Proceedings of the Seventh ACM Symposium on Cloud Computing, Oct. 5, 2016, pp. 223-236.

"Non Final Office Action Issued in U.S. Appl. No. 15/622,005", dated Feb. 21, 2019, 9 Pages.

"Final Office Action Issued in U.S. Appl. No. 15/622,005", dated Jul. 19, 2019, 6 Pages.

\* cited by examiner

| Domain Name | Cloud Instance Identifier |
|---|---|
| contoso.com | microsoftonline.com |
| contoso.de | microsoftonline.de |
| defense.com | microsoftonline.us |
| ... | ... |

FIG. 9

CROSS CLOUD TENANT DISCOVERY

FIELD

The present disclosure relates to cloud computing and more particularly to cloud computing architectures in which tenants and their associated users are partitioned into separate clouds.

BACKGROUND

Cloud computing is growing at a rapid pace due to its many advantages, which include the ability to store data, process data, and communicate without having to maintain your own hardware and, in some cases, without having to maintain various layers of a software stack on top of that hardware. Meanwhile, storing data and performing computing in the cloud may raise privacy and legal questions. For example, some industries may have regulatory requirements about where their data can be stored. Certain countries and economic zones may have laws and regulations governing where the data of their residents and companies may be stored. Further, some entities may wish to prevent other actors, such as governments, from having the ability to access their data. For example, a sovereign state may wish to prevent another sovereign state from having access to data either in transit or at rest.

To address these concerns, sovereign clouds are being developed, in which data and processing is restricted to a certain scope and access by outside parties is prevented. In some instances, sovereign clouds are restricted by geographic scope. For example, a German sovereign cloud (such as the BLACK FOREST sovereign cloud developed by Microsoft Corporation) may be solely hosted in Germany, with all servers in the German sovereign cloud being physically located in Germany and communicating using network links solely within Germany. In such a configuration, parties outside of Germany, such as a U.S. company, are technically unable to access or modify data within the German cloud, even if compelled by court order in a jurisdiction outside of Germany. A sovereign cloud may be referred to more generally as an isolated cloud, in contrast to a non-isolated, or public, cloud.

Tenants of sovereign clouds may wish to allow their users to interact with users of other sovereign clouds or of a public cloud. Further, tenants of a sovereign cloud may wish to allow their users to access public services and applications that rely on data stored in the public cloud as opposed to the sovereign cloud.

Prior to the invention described below, identifying whether a user is a member of a tenant in a sovereign cloud, and more particularly which sovereign cloud, was technologically difficult. An application in the public cloud (referred to for convenience as a "public application") might need to be specifically configured for each tenant, and maybe even with a list of users of that tenant, so that the public application would know to which sovereign cloud a user belonged. Such manual configuration might in fact be necessary for each public application.

Further, authenticating a user when that user's authentication data resides in a sovereign cloud posed technological challenges for developers of public applications. Still further, beyond authenticating the user, authorizing access to public resources for sovereign cloud users raised additional technological hurdles.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A computer-implemented method for a security endpoint of a non-isolated computing environment includes receiving a request related to an application. The application operates in the non-isolated computing environment. The request identifies a domain name of a user. The method includes, in response to receiving the request, querying a directory service according to the domain name of the user. The directory service stores a mapping between a plurality of domain names and a plurality of computing environments. The plurality of computing environments includes the non-isolated computing environment and a plurality of isolated computing environments. The method includes, subsequent to querying the directory service, receiving, from the directory service, an indication of a first computing environment of the plurality of computing environments to which the user belongs. The method includes, in response to receiving the indication of the first computing environment from the directory service, generating and sending a response to allow the user to be authenticated to the application. In response to the first computing environment being the non-isolated computing environment, the response indicates that the user belongs to the non-isolated computing environment. In response to the first computing environment being one of the plurality of isolated computing environments, the response indicates that the user does not belong to the non-isolated computing environment.

In other features, the non-isolated computing environment is a public cloud computing environment. The plurality of computing environments are sovereign cloud computing environments. In other features, the security endpoint is a security token service. In other features, the indication of the first computing environment uniquely identifies the first computing environment.

In other features, the indication of the first computing environment identifies a security endpoint of the first computing environment. In other features, the indication of the first computing environment specifies a location of the security endpoint of the first computing environment. In other features, the indication of the first computing environment specifies a fully qualified domain name of the security endpoint of the first computing environment.

In other features, in response to the first computing environment being one of the plurality of isolated computing environments, the response includes the indication of the first computing environment. In other features, the request is a discovery request received from the application by the security endpoint and the response is a discovery response transmitted to the application by the security endpoint. In other features, the request identifies a user principal name (UPN) of the user, and the UPN identifies the domain name of the user. In other features, the domain name of the user is a substring of the UPN.

A security endpoint of a non-isolated computing environment includes a computer-readable storage device configured to store computer-executable instructions. The security endpoint includes a processing device configured to execute the computer-executable instructions, which upon execution by the processing device, control the system to perform instructions including receiving a request related to an application. The application operates in the non-isolated computing environment. The request identifies a domain name of a user. The instructions include, in response to receiving the request, querying a directory service according to the domain name of the user. The directory service stores a mapping between a plurality of domain names and a plurality of computing environments. The plurality of computing environments includes the non-isolated computing environment and a plurality of isolated computing environments. The instructions include, subsequent to querying the directory service, receiving, from the directory service, an indication of a first computing environment of the plurality of computing environments to which the user belongs. The instructions include, in response to receiving the indication of the first computing environment from the directory service, generating and sending a response to allow the user to be authenticated to the application. In response to the first computing environment being the non-isolated computing environment, the response indicates that the user belongs to the non-isolated computing environment. In response to the first computing environment being one of the plurality of isolated computing environments, the response indicates that the user does not belong to the non-isolated computing environment.

In other features, the non-isolated computing environment is a public cloud computing environment and the plurality of computing environments are sovereign cloud computing environments. In other features, the security endpoint is a security token service. In other features, the indication of the first computing environment uniquely identifies the first computing environment.

In other features, the indication of the first computing environment identifies a security endpoint of the first computing environment. In other features, the indication of the first computing environment specifies a location of the security endpoint of the first computing environment. In other features, the indication of the first computing environment specifies a fully qualified domain name of the security endpoint of the first computing environment.

In other features, the computer-executable instructions, when executed by the processing device, control the system to perform further steps including, in response to the first computing environment being one of the plurality of isolated computing environments, including the indication of the first computing environment in the response. In other features, the request is a discovery request received from the application by the security endpoint. The response is a discovery response transmitted to the application by the security endpoint. In other features, the request identifies a user principal name (UPN) of the user and the UPN identifies the domain name of the user. In other features, the domain name of the user is a substring of the UPN.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

FIG. 9 is an example partition table used in resolving a user lookup at a directory service.

In the drawings, reference numbers may be reused to identify similar and/or identical elements.

DETAILED DESCRIPTION

Environment

Below are simplistic examples of a distributed computing environment in which the systems and methods of the present disclosure can be implemented. Throughout the description, references to terms such as servers, client devices, applications and so on are for illustrative purposes only. The terms server and client device are to be understood broadly as representing computing devices with one or more processors and memory configured to execute machine readable instructions. The terms application and computer program are to be understood broadly as representing machine readable instructions executable by the computing devices.

Figure 1:
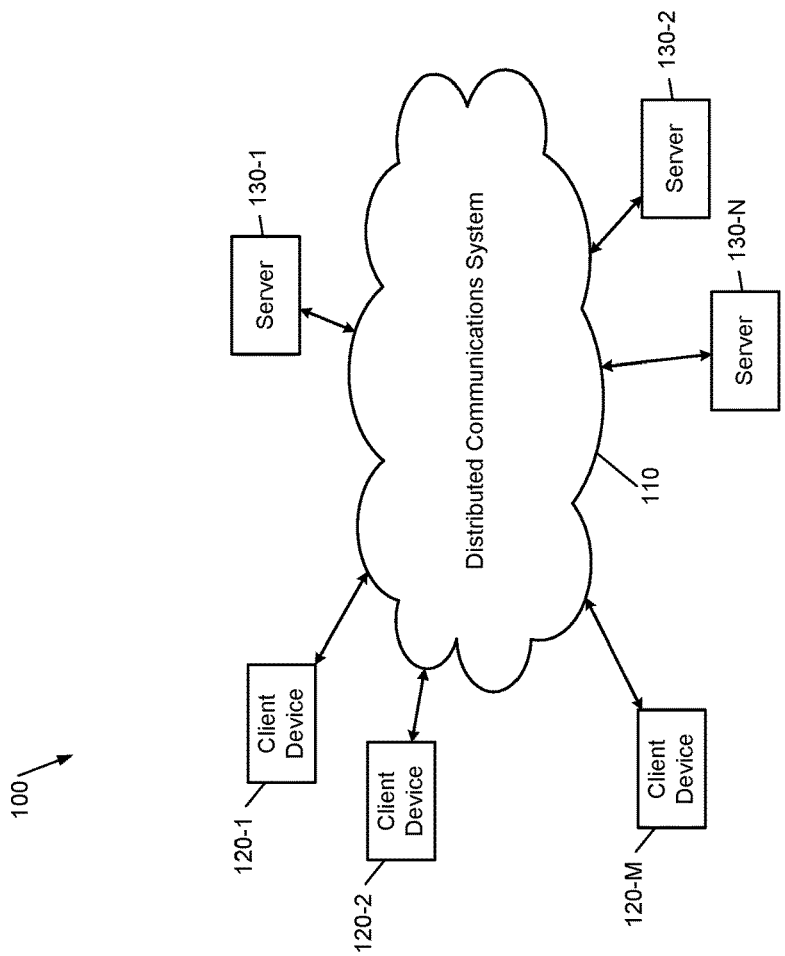
FIG. 1 is a simplified block diagram of an example distributed computing system.

FIG. 1 shows a simplified example of a distributed computing system 100. The distributed computing system 100 includes a distributed communications system 110, one or more client devices 120-1, 120-2, . . . , and 120-M

(collectively, client devices 120), and one or more servers 130-1, 130-2, . . . , and 130-M (collectively, servers 130). M and N are integers greater than or equal to one. The distributed communications system 110 may include a local area network (LAN), a wide area network (WAN) such as the Internet, or other type of network. The client devices 120 and the servers 130 may be located at different geographical locations and communicate with each other via the distributed communications system 110. The client devices 120 and the servers 130 connect to the distributed communications system 110 using wireless and/or wired connections.

The client devices 120 may include smartphones, tablets, personal digital assistants (PDAs), laptop computers, personal computers (PCs), etc. The servers 130 may provide multiple services to the client devices 120. For example, the servers 130 may execute software applications developed by one or more vendors. The server 130 may host multiple databases that are relied on by the software applications in providing services to users of the client devices 120.

Figure 2:
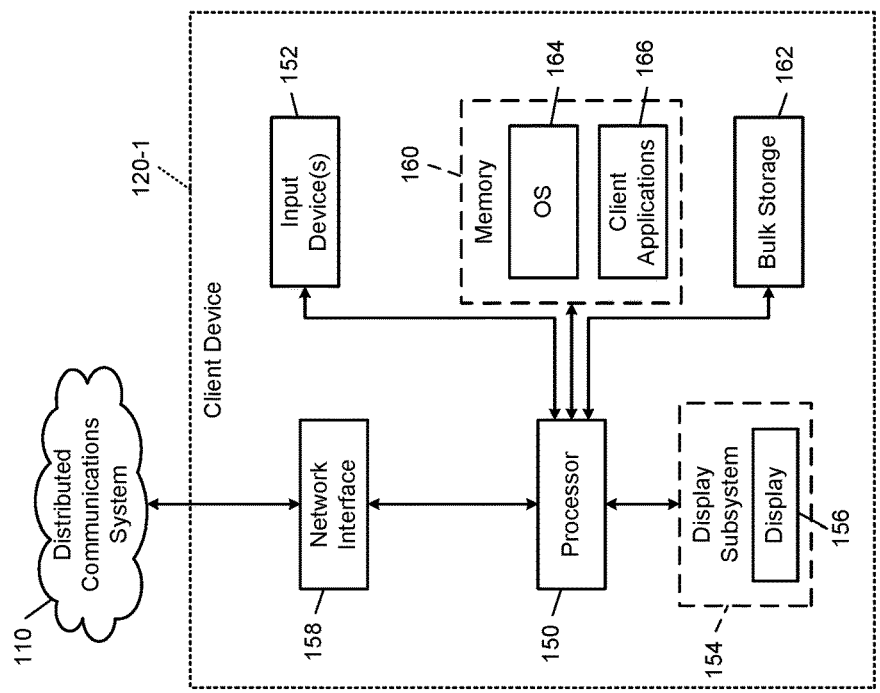
FIG. 2 is a functional block diagram of an example implementation of a client device.

FIG. 2 shows a simplified example of the client device 120-1. The client device 120-1 may typically include a central processing unit (CPU) or processor 150, one or more input devices 152 (e.g., a keypad, touchpad, mouse, touchscreen, etc.), a display subsystem 154 including a display 156, a network interface 158, memory 160, and bulk storage 162.

The network interface 158 connects the client device 120-1 to the distributed computing system 100 via the distributed communications system 110. For example, the network interface 158 may include a wired interface (for example, an Ethernet interface) and/or a wireless interface (for example, a Wi-Fi, Bluetooth, near field communication (NFC), or other wireless interface). The memory 160 may include volatile or nonvolatile memory, cache, or other type of memory. The bulk storage 162 may include flash memory, a magnetic hard disk drive (HDD), and other bulk storage devices.

The processor 150 of the client device 120-1 executes an operating system (OS) 164 and one or more client applications 166. The client applications 166 include an application that accesses the servers 130 via the distributed communications system 110.

Figure 3:
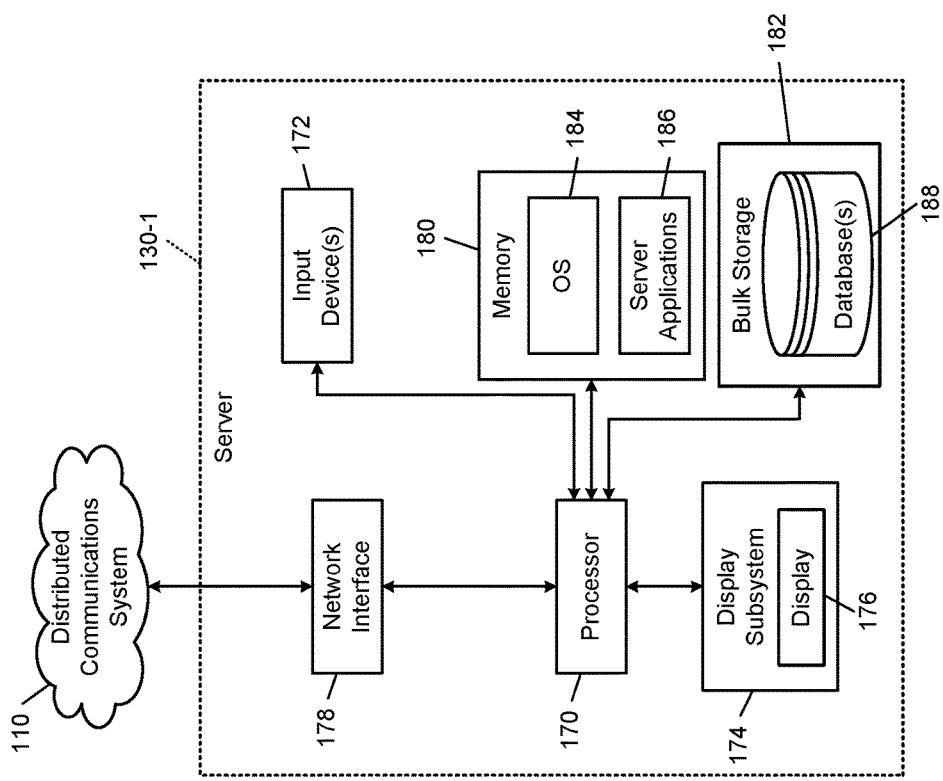
FIG. 3 is a functional block diagram of an example implementation of a server.

FIG. 3 shows a simplified example of the server 130-1. The server 130-1 typically includes one or more CPUs or processors 170, a network interface 178, memory 180, and bulk storage 182. In some implementations, the server 130-1 may be a general-purpose server and include one or more input devices 172 (e.g., a keypad, touchpad, mouse, and so on) and a display subsystem 174 including a display 176.

The network interface 178 connects the server 130-1 to the distributed communications system 110. For example, the network interface 178 may include a wired interface (e.g., an Ethernet interface) and/or a wireless interface (e.g., a Wi-Fi, Bluetooth, near field communication (NFC), or other wireless interface). The memory 180 may include volatile or nonvolatile memory, cache, or other type of memory. The bulk storage 182 may include flash memory, one or more magnetic hard disk drives (HDDs), or other bulk storage devices.

The processor 170 of the server 130-1 executes an operating system (OS) 184 and one or more server applications 186, which may be housed in a virtual machine hypervisor or containerized architecture. The bulk storage 182 may store one or more databases 188 that store data structures used by the server applications 186 to perform respective functions.

Functional Block Diagram

Figure 4:
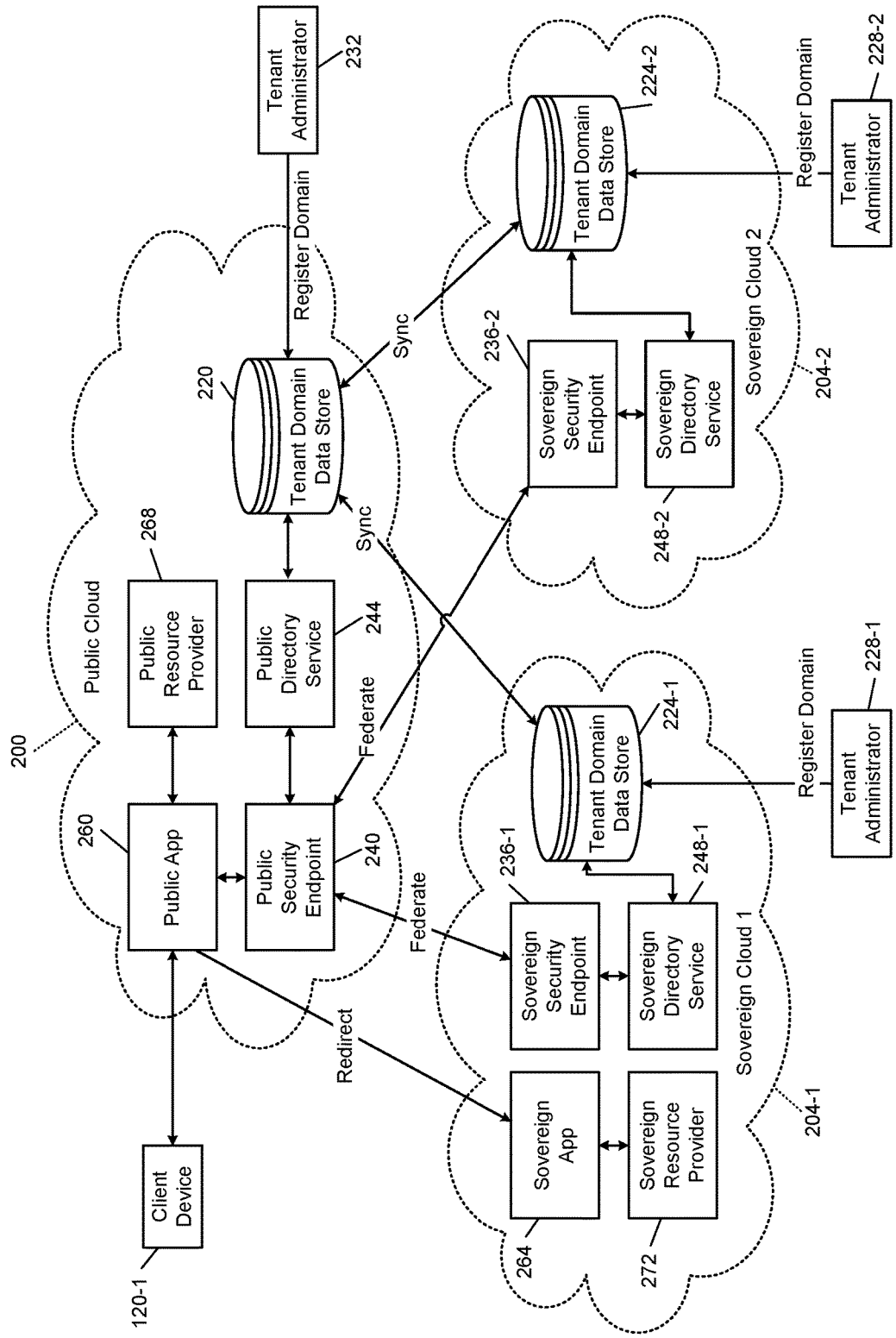
FIG. 4 is a functional block diagram of example cloud computing environments in which a public cloud and two sovereign clouds are shown.

In FIG. 4, a public cloud 200 and sovereign clouds 204-1 and 204-2 are shown. The sovereign clouds 204-1 and 204-2 are referred to collectively as sovereign clouds 204, and in practical implementations, there may be one or more sovereign clouds 204. Each cloud of the public cloud 200 and the sovereign clouds 204 is composed of computing, storage, and communication resources. These resources may be managed and allocated to various tenants of the respective cloud by a management fabric (not shown).

In general terms, the public cloud 200 may be referred to as a non-isolated computing environment while the sovereign clouds 204-1 and 204-2 may be referred to as isolated computing environments. Each computing environment has at least one tenant, which refers to an entity that has registered for service with the corresponding computing environment. Each cloud may also have individual users, who may be referred to as consumers.

A tenant may be a company, government, corporation, or other entity. The tenant and the corresponding computing environment may have a contractual relationship, which may specify details such as pricing, privacy policies, and a service level agreement (SLA). When a tenant is associated with a first computing environment, users within the tenant (for example, employees of a business) access resources and applications within the first computing environment, and data for those users, including authentication information and personal documents, is stored within the first computing environment.

For each cloud, the resources may all be located in a single physical location, such as a data center or a subset of a data center. In other implementations, the resources of the cloud may be distributed across multiple geographical locations. For purposes of the below discussion, the physical locations and physical interconnections of resources are not relevant, so the cloud will be treated as a monolithic entity.

In the public cloud 200, a tenant domain data store 220 stores information about the domain names associated with each tenant of the public cloud 200 and of the sovereign clouds 204. Domain names refer to the public records used in domain name system (DNS) queries. For context, contoso.com and contoso.de are examples of domain names. The tenant domain data store 220 may maintain a mapping between tenant domain names and the cloud to which the corresponding tenants belong. For example, see FIG. 9 below, where a mapping is shown between domain name and cloud identifier.

The tenant domain data store 220 may receive information about sovereign tenant domain names from tenant domain data stores 224-1 and 224-2, which are located in the sovereign clouds 204-1 and 204-2, respectively. In various implementations, data is synchronized between the tenant domain data store 220 and the tenant domain data stores 224 such that each has a full copy of the mapping data. A tenant administrator 228-1 for a tenant associated with the sovereign cloud 204-1 may register domains possessed by the tenant with the tenant domain data store 224-1.

For example, if the tenant is the fictitious Contoso corporation, the tenant administrator 228-1 (who may be an information technology professional at the Contoso corporation) may indicate to the tenant domain data store 224-1 that domain contoso.de is owned by the tenant. In various implementations, a verification system (not shown) may verify that the tenant administrator 228-1 actually possesses control over that domain. For example, the verification system may generate a random string and provide the string to the tenant administrator 228-1. By inserting that string into the authoritative DNS record for contoso.de, the tenant administrator 228-1 can demonstrate control of contoso.de to the verification system.

Similarly, a tenant administrator 228-2 for a tenant associated with the sovereign cloud 204-2 may register the tenant's domains with the tenant domain data store 224-2. In various implementations, the tenant domain data store 224-2 may periodically synchronize with the tenant domain data store 220 to ensure that all records are up-to-date. In various implementations, the tenant domain data store 224-2 also asynchronously sends updates to the tenant domain data store whenever a new domain is registered. In this way, it may be possible for the correct computing environment to be determined for a user of a tenant within seconds of the tenant domain data store 224-2 being notified of the user's domain by the tenant. A tenant administrator 232 for a tenant associated with the public cloud 200 may register domains owned by the tenant with the tenant domain data store 220.

The mapping in the tenant domain data store 220 may indicate, for example, that a certain domain name of a tenant is associated with the sovereign cloud 204-1. The sovereign cloud 204-1 may be indicated with any unique identifier. For example, the unique identifier for the sovereign cloud 204-1 may be a fully qualified domain name (FQDN) for a sovereign security endpoint 236-1 in the sovereign cloud 204-1. Similarly, the sovereign cloud 204-2 may be identified by an FQDN of a sovereign security endpoint 236-2 of sovereign cloud 204-2.

The public cloud 200 includes a public security endpoint 240, which may federate with the sovereign security endpoints 236 for login purposes, as described in more detail below. The unique identifier of the public cloud 200 may be an FQDN of the public security endpoint 240.

Each of the public security endpoint 240, the sovereign security endpoint 236-1, and the sovereign security endpoint 236-2 may be implemented as a security token service (STS). The public security endpoint 240 may query a public directory service 244 to determine which cloud (that is, the public cloud 200 or one of the sovereign clouds 204) is associated with a certain user. The public directory service 244 may rely on the tenant domain data store 220 to determine that mapping.

For example, the user may be identified by a two-part format including a user name and domain name separated by a special character. For example, a user principal name (UPN) format may be used in which the special character is the "@" symbol, which results in the UPN appearing similar to, and in some cases being the same as, the user's email address.

The public directory service 244 may use the domain name portion of the UPN to query the tenant domain data store 220. For example, the tenant domain data store 220 may store the mapping in a relational database or a lookup table, where the domain name is the key value. As a specific example, the tenant domain data store 220 may store a partition table, an example of which is described in more detail below with respect to FIG. 9.

The public directory service 244 may also include information about what resources the user of the public cloud 200 is permitted to access. In other words, the public directory service 244 includes authorization data related to users associated with the public cloud 200. The sovereign clouds 204-1 and 204-2 include sovereign directory services 248-1 and 248-2, respectively (referred to collectively as the sovereign directory services 248). For the sovereign cloud 204-1, the sovereign directory service 248-1 includes authorization data related to users associated with the sovereign cloud 204-1.

The public directory service 244 may also include authentication data, such as password-related data, to verify the identity of a user. Similarly, the sovereign directory services 248 may store authentication data to verify the identity of users associated with the respective sovereign clouds 204. In various implementations, the public directory service 244 and/or one or more of the sovereign directory services 248 may be implemented as AZURE ACTIVE DIRECTORY domain services from Microsoft Corp.

A public application 260 in the public cloud 200 may be accessed by a user, such as the user of the client device 120-1. In various implementations, the public application 260 may be operated by the server 130-1. Other elements of FIG. 4, such as the public security endpoint 240 and the public directory service 244, may also be operated by one or more of the servers 130.

The public application 260 may rely on the public security endpoint 240 to authenticate the user of the client device 120-1. For brevity, this may be referred to as authenticating the client device 120-1. The client device 120-1 may be used by different people who may be associated with different tenants and, therefore, may be associated with different clouds. Still further, a single user may have multiple sets of credentials—for example, a government worker may have government credentials used with a sovereign cloud for that government, but may also have personal credentials for use with the public cloud 200. As a result, a single user may authenticate with the public cloud 200 with one set of credentials as well as with, for example, the sovereign cloud 204-1 using another set of credentials.

In some scenarios, the developer of the public application 260 may have also deployed a sovereign edition of the application in one or more of the sovereign clouds 204. As an example, in FIG. 4 the sovereign cloud 204-1 is shown with a sovereign application 264 corresponding to the public application 260. Because the developer of the public application 260 may not implement an edition of the public application 260 in every sovereign cloud, this is demonstrated by not showing an edition of a sovereign application 260 in the sovereign cloud 204-2.

The public application 260 may store data for the client device 120-1 in a public resource provider 268. For example, if the public application 260 is a chat program, the public resource provider 268 may store chat text. If the public application 260 is a calendar service, the public resource provider 268 may store appointment data. The sovereign cloud 204-1 includes a sovereign resource provider 272, which stores data used by the sovereign application 264.

The sovereign resource provider 272 may be developed and maintained by the developer of the sovereign application 264. In other implementations, the sovereign resource provider 272 may be a service provided by the maintainer of the sovereign cloud 204-1. Similarly, the public resource provider 268 may be one of the services offered by the public cloud 200. For example, the public resource provider 268 may be a block storage service operated by the same entity as the public cloud 200.

As described in more detail below, when the user accesses the public application 260 using the client device 120-1, the public application 260 may authenticate the client device 120-1 using the public security endpoint 240. The public security endpoint 240 may determine whether the user corresponds to the public cloud 200 by querying the public directory service 244, which relies on the mapping stored by the tenant domain data store 220. If the user corresponds to one of the sovereign clouds 204, the public security endpoint 240 federates with the corresponding one of the sovereign security endpoints 236.

The user may be associated with a tenant of the public cloud 200. However, if the user is not associated with any tenant of the public cloud 200 or a sovereign cloud, the user is assumed to be a consumer associated with the public cloud 200.

The public application 260 may redirect the client device 120-1 to the sovereign application 264 once the client device 120-1 has been authenticated. In various implementations, when the client device 120-1 has been associated with the sovereign cloud 204-1, the public application 260 will persistently redirect the client device 120-1 to the sovereign application 264 so that the resources associated with the client device 120-1 will be stored in the sovereign resource provider 272 and not the public resource provider 268.

User Lookup

Figure 5A:
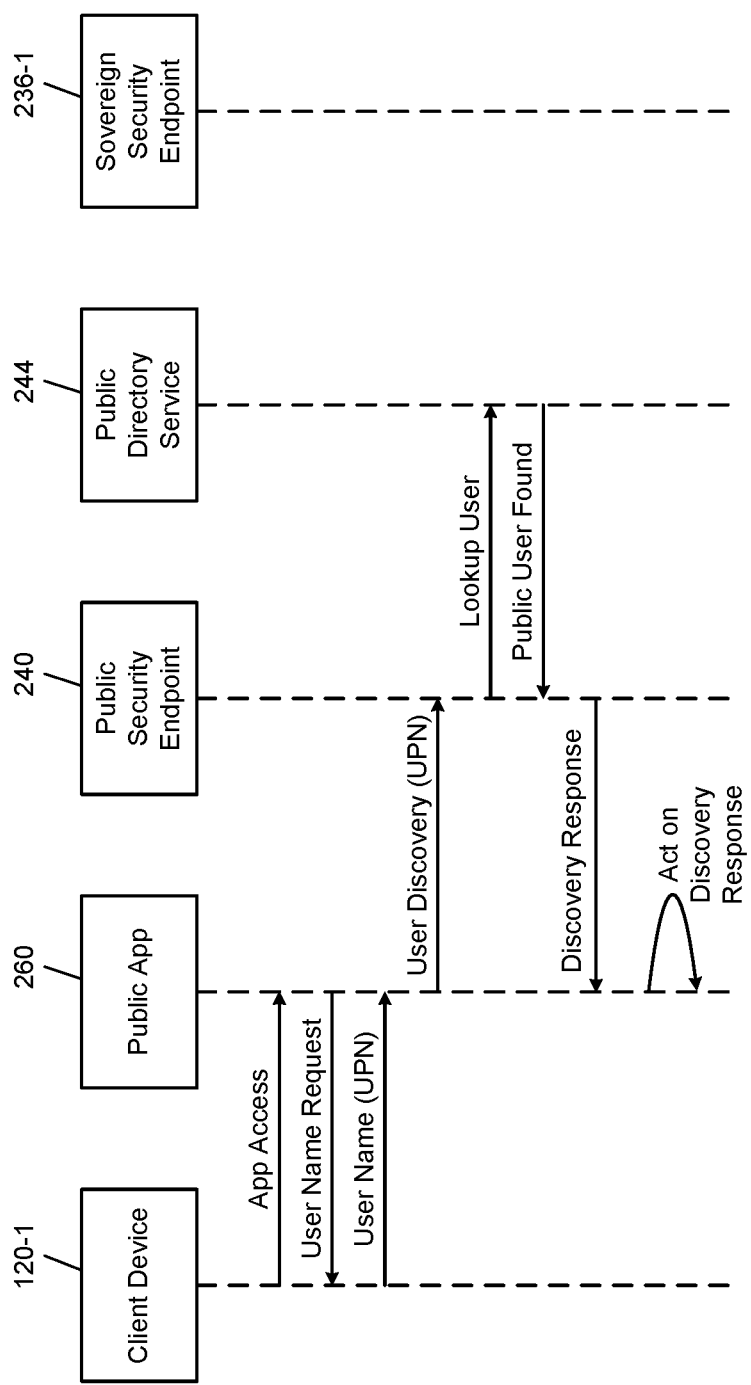
FIG. 5A is a message sequence chart of a user lookup performed according to the principles of the present disclosure in the case where the user belongs to the public cloud.
Figure 5B:
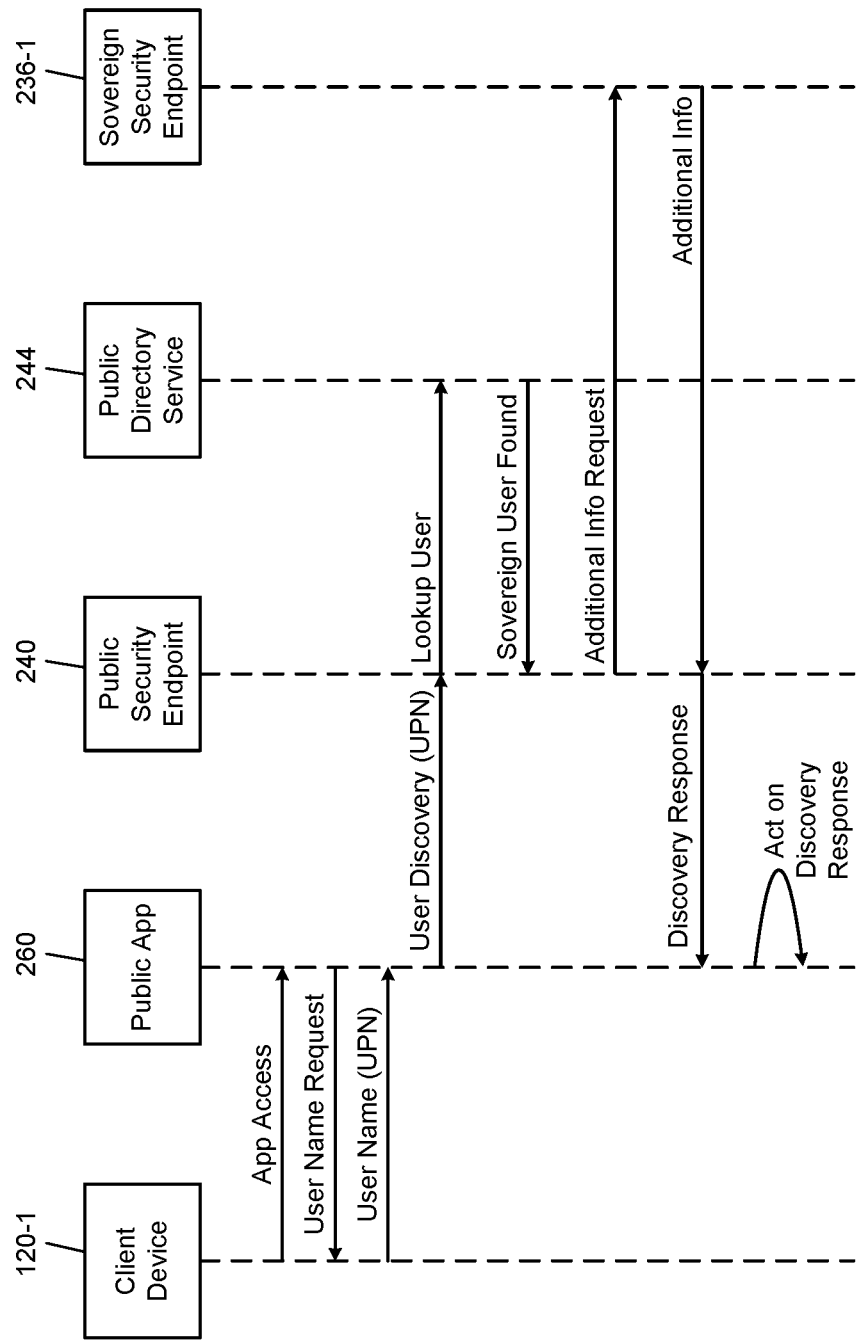
FIG. 5B is a message sequence chart of a user lookup in the case where the user belongs to a sovereign cloud.

In FIG. 5A and FIG. 5B, an example user lookup process is demonstrated for a public user (a user associated with the public cloud 200) and a sovereign user (a user associated with the sovereign cloud 204-1), respectively. In FIG. 5A, the user of the client device 120-1 accesses the public application 260. For example, the user may use a native application installed on the client device 120-1 that corresponds to the public application 260 or may use a web browser to access a web interface of the public application 260.

If the public application 260 is not already aware of the name of the user of the client device 120-1, the public application 260 may send a user name request to the client device 120-1. The public application 260 may already know the user name of the client device 120-1 if, for example, the client device 120-1 presented a token to the public application 260 or if a cookie was previously set in a browser in the client device 120-1 by the public application 260.

In response to the user name request, the client device 120-1 sends the user's name information to the public application 260. For example, the user name information may take the form of a UPN. The public application 260 sends a user discovery request to the public security endpoint 240. The user discovery request depicted in FIG. 5A includes information about the user, such as the UPN. In various implementations, the public security endpoint 240 may instead query the client device 120-1 to obtain the user name, as described in more detail below.

In some implementations, the user discovery request may only include the domain name of the user, as that may be all that is necessary to identify which cloud the user is associated with. However, additional information in the UPN may allow the public security endpoint 240 to provide or consult more granular information specific to the user.

The public security endpoint 240 queries the public directory service 244 using a lookup user request. The public directory service 244 determines which cloud the user is associated with based on the tenant domain data store 220. For example, the public directory service 244 may look up the domain name of the user within the tenant domain data store 220 and provide that information to the public security endpoint 240.

The response of the public directory service 244 to the public security endpoint 240 may include the fully qualified domain name (FQDN) of the relevant security endpoint. In the case that the user is a public user, the FQDN may correspond to the public security endpoint 240. In the case that the user is associated with the sovereign cloud 204-1 (as shown in FIG. 5B), the response from the public directory service 244 may contain the FQDN of the sovereign security endpoint 236-1. The public security endpoint 240 then transmits a discovery response to the public application 260, including an indication of the cloud to which the user belongs. The public application 260 can then act on that discovery response. For example, only, the action performed may be a login sequence, as described in more detail below.

In FIG. 5B, the process proceeds similarly to that of FIG. 5A, but the public directory service 244 recognizes that the user is associated with the sovereign cloud 204-1 in response to the lookup user request. The public directory service 244 therefore responds to the public security endpoint 240 indicating that the user was found to be a sovereign user. The public security endpoint 240 provides a discovery response to the public application 260 indicating that the user is associated with the sovereign cloud 204-1. The public application 260 can then act on the discovery response. The response from the public directory service 244 as well as the response from the public security endpoint 240 may each include a unique identifier, such as a uniform resource identifier (URI) of the corresponding cloud. More particularly, the URI may be a URL, such as an FQDN associated with the sovereign security endpoint of the corresponding cloud.

In various implementations, the public security endpoint 240 may send an additional information request to the sovereign security endpoint 236-1. This request may be directed to the sovereign security endpoint 236-1 by simply resolving (with a DNS query) the FQDN provided by the public directory service 244.

The sovereign security endpoint 236-1 responds to the public security endpoint 240 with additional information, such as the types of protocols supported by the sovereign cloud 204-1 and/or other metadata, which may describe the capabilities and claims support of the sovereign security endpoint 236-1. A claim is a statement that one subject makes about itself or another subject. This statement can be about, for example, a name, identity, key, group, privilege, or capability. Claims are issued by a provider, and they are given one or more values and then packaged in a security token issued by an issuer, which may be called a security token service (STS). The public security endpoint 240 and the sovereign security endpoints 236 may each be implemented as an STS.

While an additional information request and an additional information response are shown in FIG. 5B, these messages may be restricted for use to only certain sovereign clouds. In other words, the public security endpoint 240 may send an additional information request only when certain sovereign clouds are indicated by the public directory service 244. In other implementations, the additional information request may be omitted altogether.

In other implementations, the public directory service 244 sends the additional information request to the sovereign security endpoint 236-1 when the corresponding sovereign cloud is identified. The additional information is then received by the public directory service 244 and provided to the public security endpoint 240 along with an indication that the user is associated with the sovereign cloud.

While not shown, additional information request and additional information response messages may be present in various implementations of FIG. 6B, FIG. 7B, FIG. 8B, FIG. 13, and FIG. 14.

Login

Figure 6A:
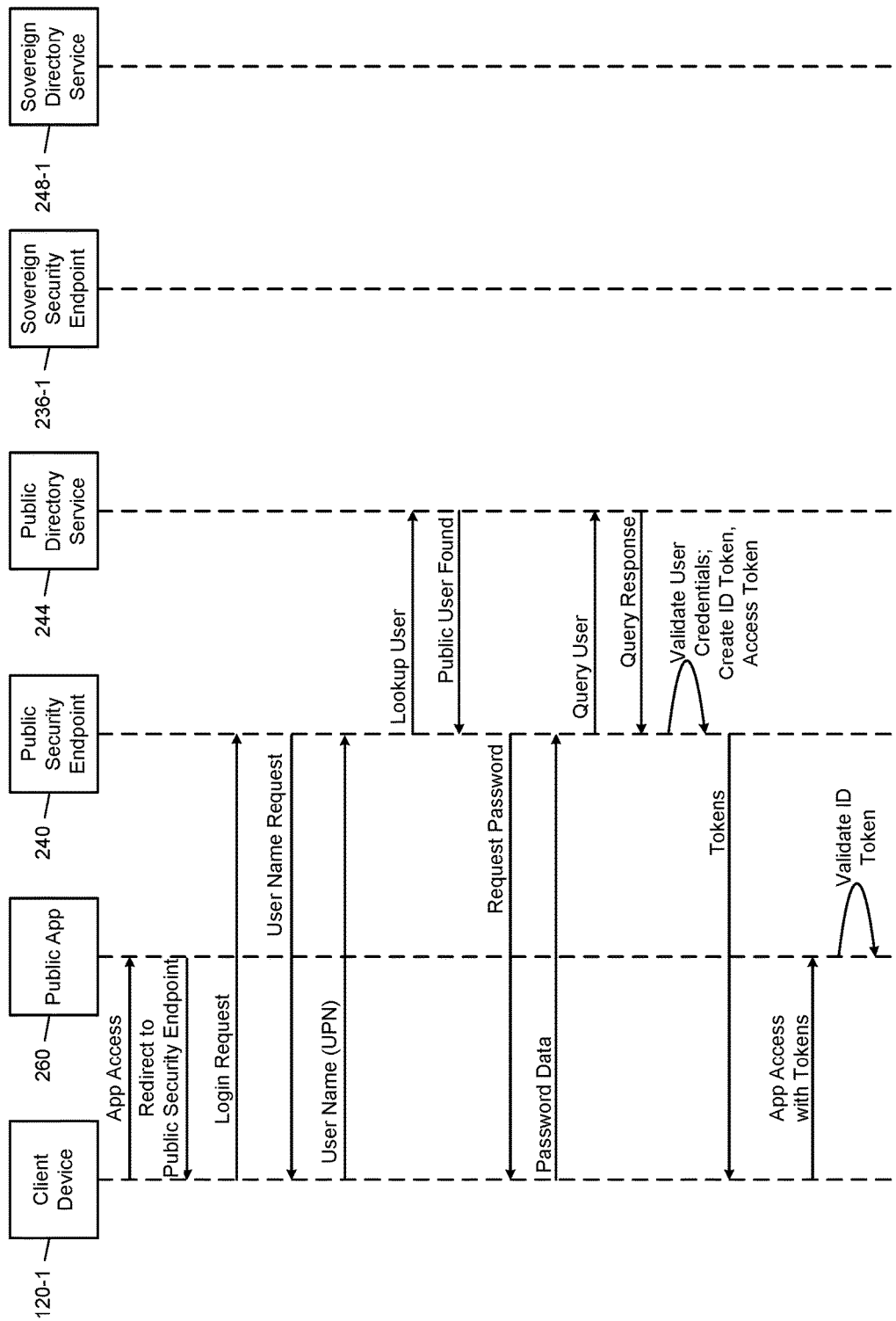
FIG. 6A is a message sequence chart of a login process according to the principles of the present disclosure in the case where the user belongs to the public cloud.
Figure 6B:
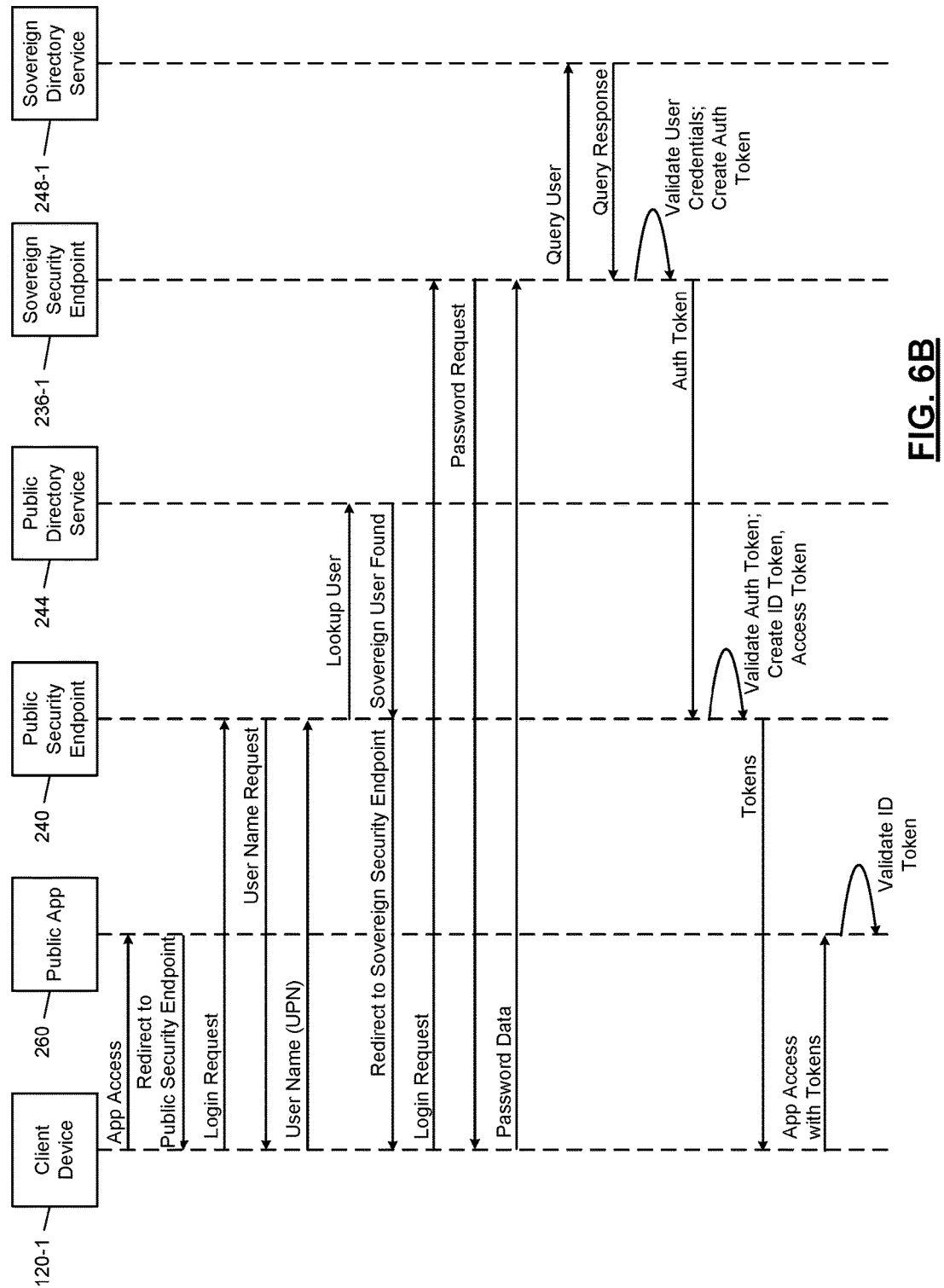
FIG. 6B is a message sequence chart of an example login process in the case where the user belongs to a sovereign cloud.

FIG. 6A and FIG. 6B show an example login process relying on the user lookup approach described above. In FIG. 6A, the scenario of a public user is shown while, in FIG. 6B, the scenario of a sovereign user is shown. In FIG. 6A, the client device 120-1 accesses the public application 260. The public application 260 may redirect the client device 120-1 to the public security endpoint 240. In response to the redirection, the client device 120-1 sends a login request to the public security endpoint 240.

The public security endpoint 240 requests the user's name from the client device 120-1. The client device 120-1 provides information about the user's name, such as a UPN, to the public security endpoint 240. The public security endpoint 240 sends a lookup user request to the public directory service 244, which responds to the public security endpoint 240 that the user is a public user. This may be indicated by specifying the FQDN of the public security endpoint 240 in the response.

The public security endpoint 240 therefore knows that the user can be authenticated by the public security endpoint 240 and requests password data from the client device 120-1. The client device 120-1 provides password data to the public security endpoint 240. The public security endpoint 240 may accept other authentication data, such as biometrics and security tokens. In addition, the public security endpoint 240 may be configured to request multiple authentication factors, such as a code sent to the user via text message or a revolving code from a cryptographic application.

The public security endpoint 240 queries the public directory service 244 regarding a user. For example, the public directory service 244 may store data that allows the client device 120-1 to be authenticated. For example, the public directory service 244 may include a hash of the password that is compared to a hash of the password entered at the client device 120-1. In various implementations, the password may be salted during hashing, and the hash algorithm may include PBKDF2 or bcrypt.

The public directory service 244 may also have information regarding fine-grained access control for the client device 120-1. According to the query response from the public directory service 244, the public security endpoint 240 validates the user credentials (such as the password) and creates an ID token and an access token. The ID token may indicate the identity of the user of the client device 120-1, while the access token may include a set of claims identifying resources and actions the user is authorized to access and perform.

The public security endpoint 240 sends the tokens to the client device 120-1. The client device 120-1 can then access the public application 260 using the provided tokens. In some implementations, when the public security endpoint 240 sends the token to the client device 120-1, the public security endpoint 240 redirects the client device 120-1 back to the public application 260. The public application 260 is able to validate the identity of the user of the client device 120-1 based on the ID token.

In FIG. 6B, the process progresses similarly to that of FIG. 6A until the public directory service 244 identifies that the user is a sovereign user in response to a lookup user request from the public security endpoint 240. The public directory service 244 indicates to the public security endpoint 240 that the user is a sovereign user and indicates an identifier of the corresponding sovereign cloud. The public security endpoint 240 federates authentication with the sovereign security endpoint 236-1 and therefore redirects the client device 120-1 to the sovereign security endpoint 236-1.

The client device 120-1, in response to the redirection, sends a login request to the sovereign security endpoint 236-1. The login request may include the UPN. If the login request does not include a UPN, the sovereign security endpoint 236-1 may request (not shown) the UPN from the client device 120-1. Once the user's name is known, the sovereign security endpoint 236-1 sends the password request to the client device 120-1, which responds with password data.

The sovereign security endpoint 236-1 queries the sovereign directory service 248-1 based on the identity of the user and receives a response from the sovereign directory service 248-1. The sovereign directory service 248-1 may provide a similar service to the sovereign security endpoint 236-1 as the public directory service 244 provided to the public security endpoint 240 in FIG. 6A.

The sovereign security endpoint 236-1 validates the presented user credentials and creates an authentication token. The authentication token is provided to the public security endpoint 240, which validates the authentication token. For example, the authentication token may be signed using the private key of the sovereign security endpoint 236-1. The public security endpoint 240 has a copy or can securely obtain a copy of the sovereign security endpoint 236-1 to validate the signature.

The public security endpoint 240 then creates an ID token and an access token. For example only, the access token may control what resources the user can access according to claims provided by the sovereign security endpoint 236-1 based on authorization data from the sovereign directory service 248-1. The public security endpoint 240 returns tokens to the client device 120-1. The client device 120-1 can then access the public application 260 using the provided tokens. The public application 260 can validate the ID token to verify the identity of the user of the client device 120-1.

Figure 7A:
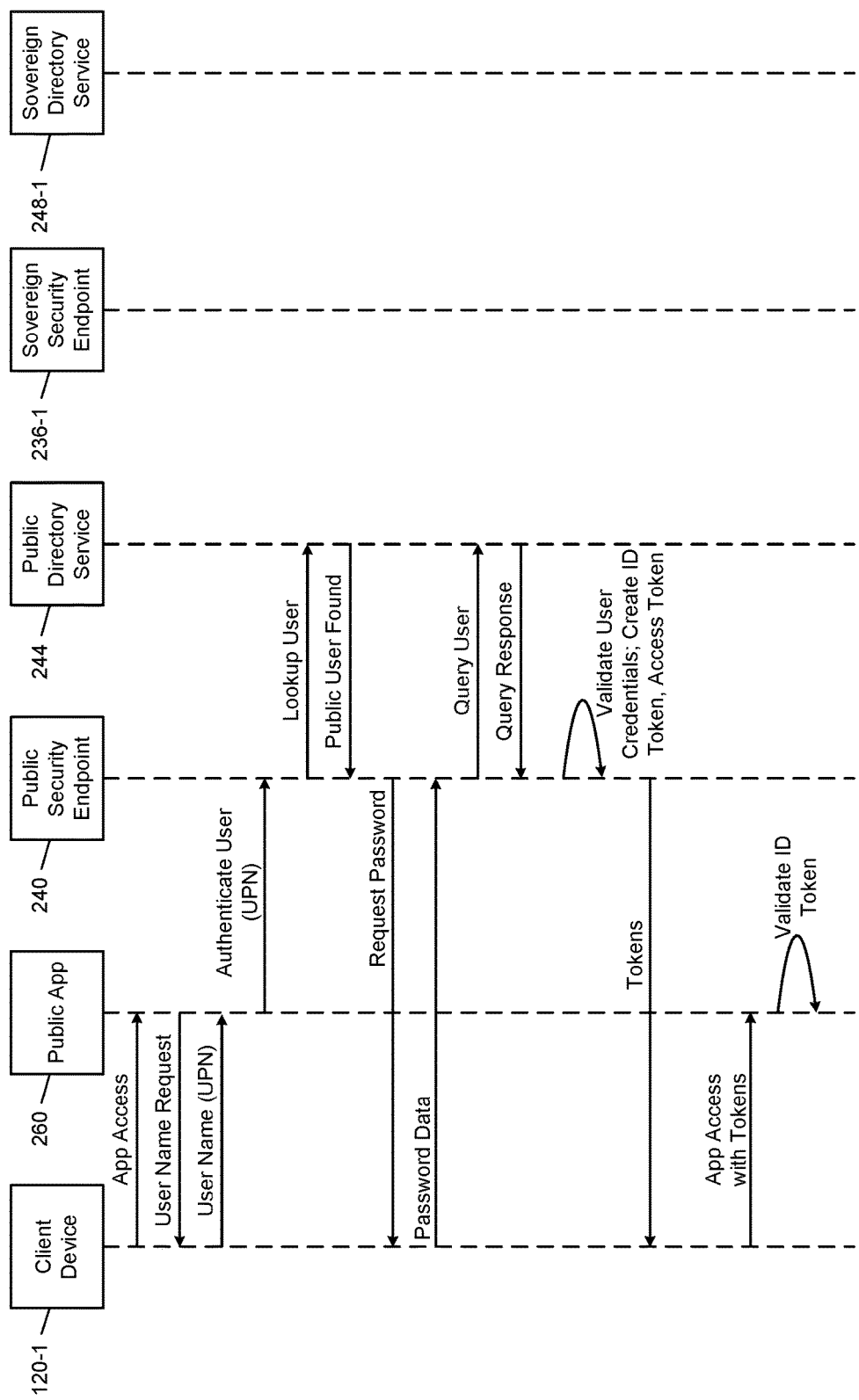
FIG. 7A is a message sequence chart of an example login process, in which the public application queries the user name, in the case where the user belongs to a public cloud.
Figure 7B:
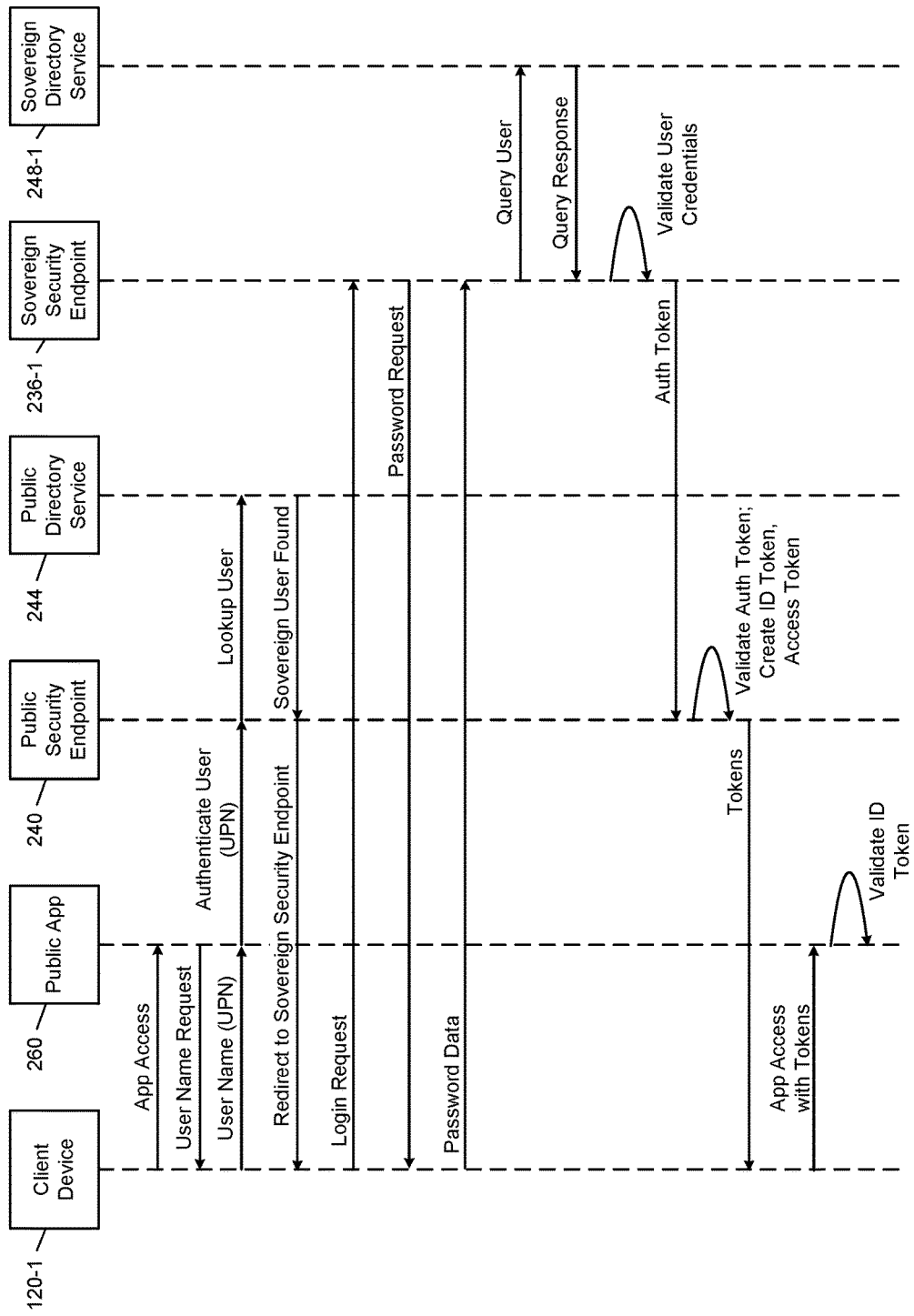
FIG. 7B is a message sequence chart of an example login process, in which the public application queries the user name, in the case where the user belongs to a sovereign cloud.

FIG. 7A and FIG. 7B show example login sequences similar to those of FIG. 6A and FIG. 6B, respectively, with the modification that the public application 260 itself requests the user name instead of relying on the public security endpoint 240 to request the user's name. In some architectures, only one of these approaches can be used. In other architectures, whether a public application requests the user name or relies on the public security endpoint 240 to request the user name is a decision made by the developer of the public application 260.

In FIG. 7A, the client device 120-1 accesses the public application 260. In response to the access, the public application 260 requests the user name from the user of the client device 120-1. The client device 120-1 provides information about the user's name, such as a UPN, to the public application 260. The public application 260 may then decide to authenticate the user by sending an authenticate user request to the public security endpoint 240. The authenticate user request may include the UPN so that the public security endpoint 240 does not need to request that information from the client device 120-1. The rest of the process may proceed similarly to that of FIG. 6A.

In FIG. 7B, once again the public application 260 requests the user name and provides the user name to the public security endpoint 240 in an authenticate user request. The process then proceeds similarly to that of FIG. 6B with a lookup user request sent from the public security endpoint 240 to the public directory service 244.

Multi-Cloud-Aware Application

Figure 8A:
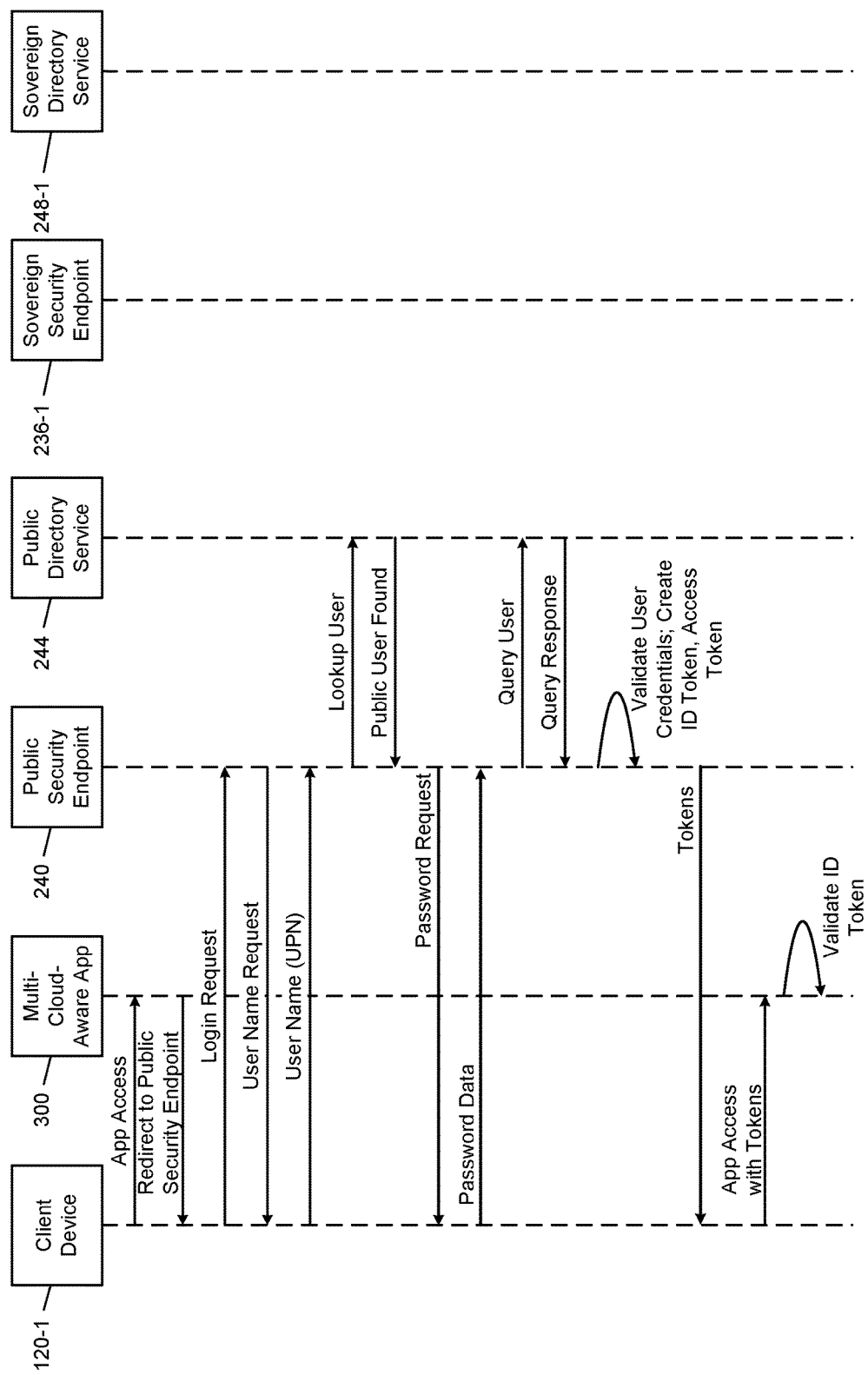
FIG. 8A is a message sequence chart of an example login process for a multi-cloud-aware application in the case where the user belongs to a public cloud.
Figure 8B:
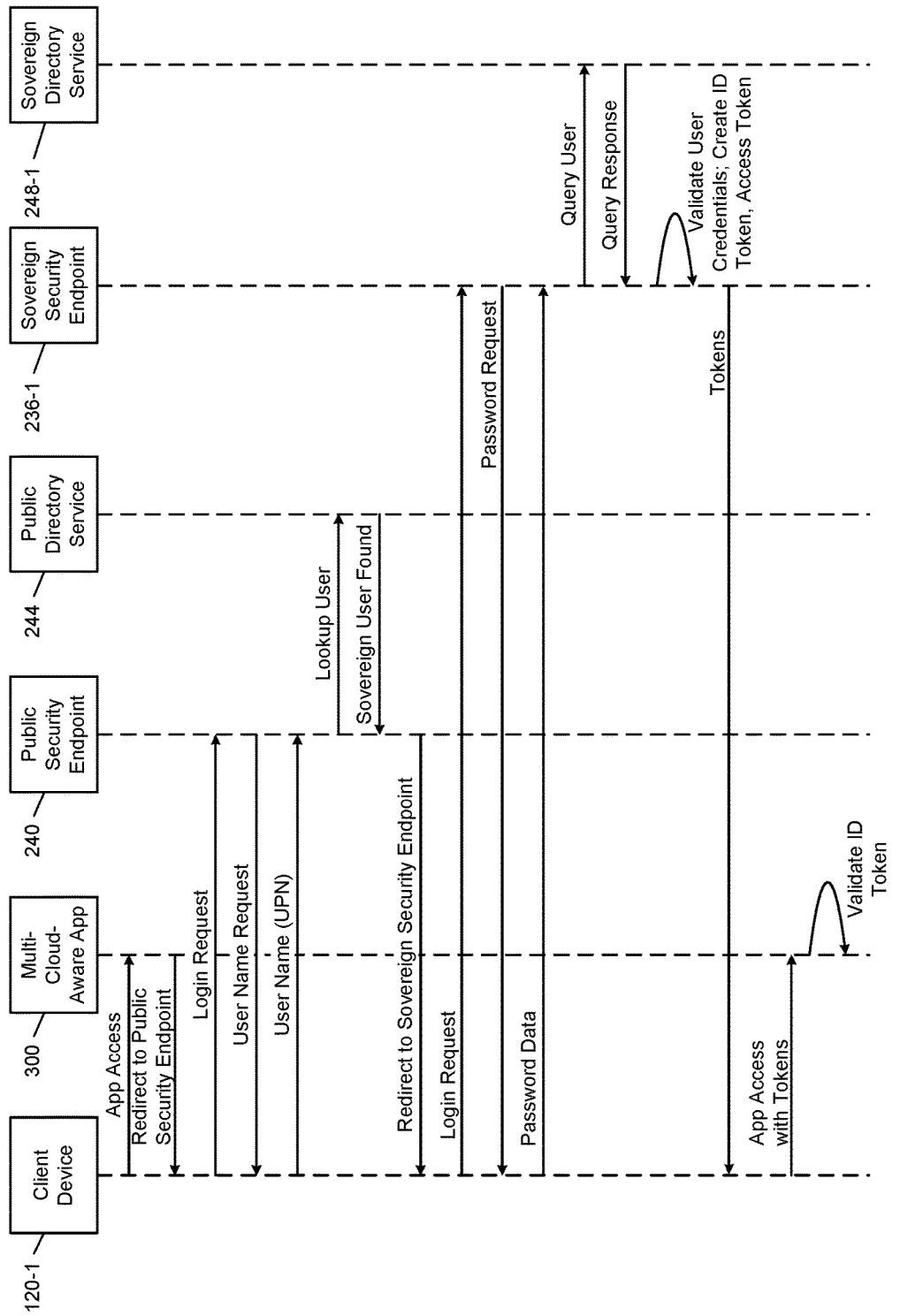
FIG. 8B is a message sequence chart of an example login process for a multi-cloud-aware application in the case where the user belongs to a sovereign cloud.

In FIG. 8A and FIG. 8B, a login process for an application that is able to validate tokens from multiple clouds is shown. An application having this capability may be called a multi-cloud-aware application. FIG. 8A shows the scenario where the user logging in is associated with the public cloud 200 while FIG. 8B shows the scenario where the user is associated with the sovereign cloud 204-1.

In FIG. 8A, the process may appear indistinguishable to that of FIG. 6A because the user is associated with the public cloud 200. Therefore, the multi-cloud-aware application 300 may not have to perform any different actions than does the public app 260 in FIG. 6A.

In FIG. 8B, the process proceeds similarly to that shown in FIG. 6B until the sovereign security endpoint 236-1 validates the user credentials. If the user's credentials are validated, the sovereign security endpoint 236-1 creates an ID token and access token and transmits these tokens directly to the client device 120-1. The client device 120-1 then accesses the multi-cloud-aware application 300 with the supplied tokens.

The multi-cloud-aware application 300 is able to validate the ID token because the multi-cloud-aware application 300 has a trust relationship with not just the public security endpoint 240 but also the sovereign security endpoint 236-1. For example, the multi-cloud-aware application 300 may store or have secure access to a certificate containing the public key of the sovereign security endpoint 236-1.

Partition Table

In FIG. 9, a simplified example of a partition table stored by the tenant domain data store 220 of FIG. 4 is shown. The partition table may be synchronized with the tenant domain data stores 224. For each record in the partition table, a domain name corresponds to a cloud instance identifier. This represents a many-to-one relationship because multiple tenants, each having their own domain name, may be associated with a single cloud instance. Further, a single tenant may have multiple domain names associated with the cloud instance.

Entries in the partition table may be provided from respective clouds. In other words, the sovereign cloud identified by "microsoftonline.de" may provide the partition table entry mapping "contoso.de" to "microsoftonline.de". Each entry in the partition table may have additional data, such as metadata about the entry including a creation time and a last modification time. Additional data for an entry may also include an indication of whether subdomains should be included. For example, the "contoso.de" record may apply to the domain contoso.de as well as to domain mail.contoso.de.

For example only, hypothetical fully qualified domain names are shown as the cloud instance identifiers. As described above, a cloud instance identifier may be the fully qualified domain name associated with the security endpoint of that cloud. In other words, in addition to identifying the cloud instance, the cloud instance identifier also specifies, via a DNS lookup, the address at which to direct a security query to that cloud. As a specific example, a user presenting a UPN of "jorgen@contoso.de" may result in a look up being performed on the partition table for "contoso.de", which resolves to "microsoftonline.de".

Flowchart

Figure 10A:
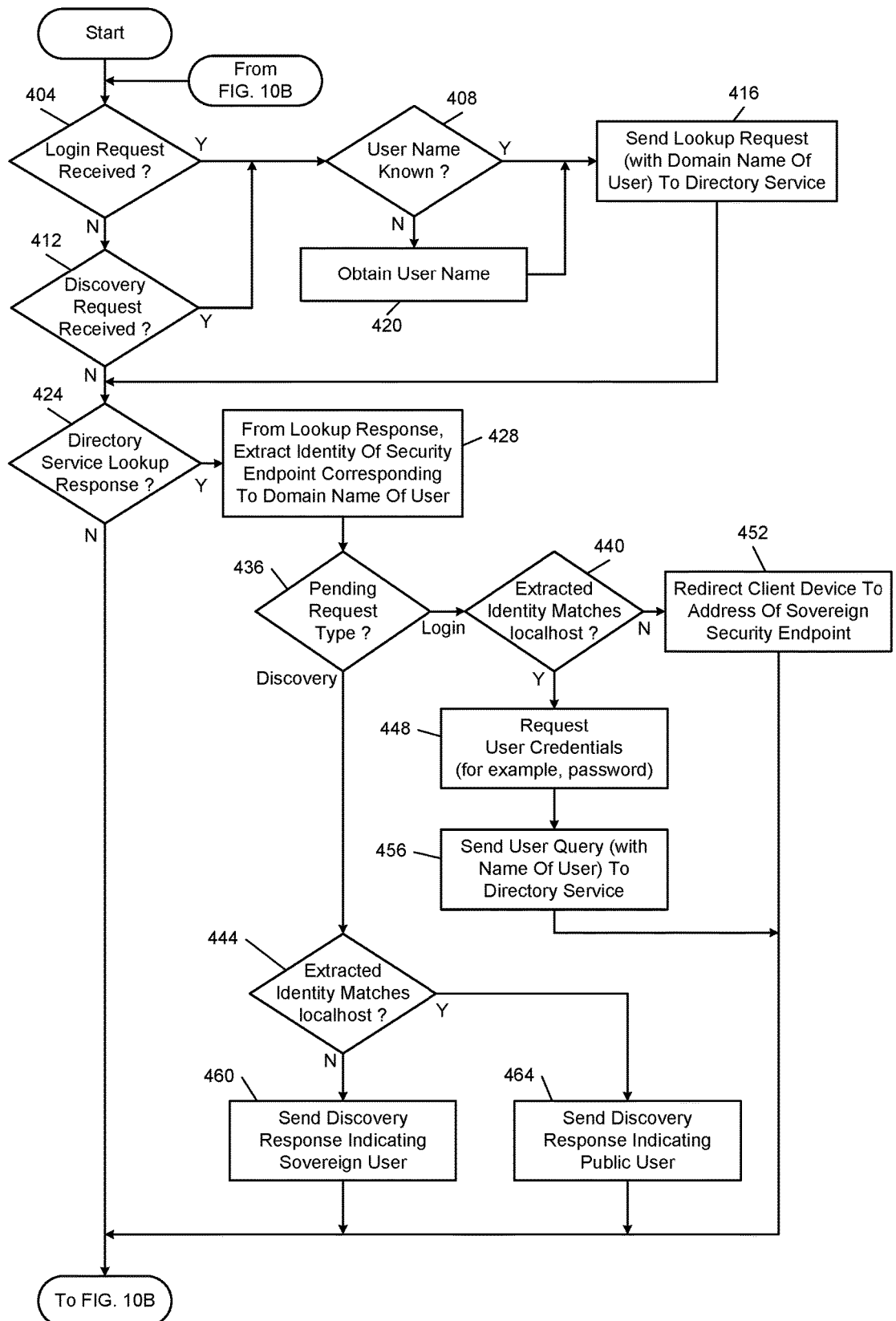
FIG. 10A and FIG. 10B together form a flowchart of example process of a public security endpoint according to the principles of the present disclosure.
Figure 10B:
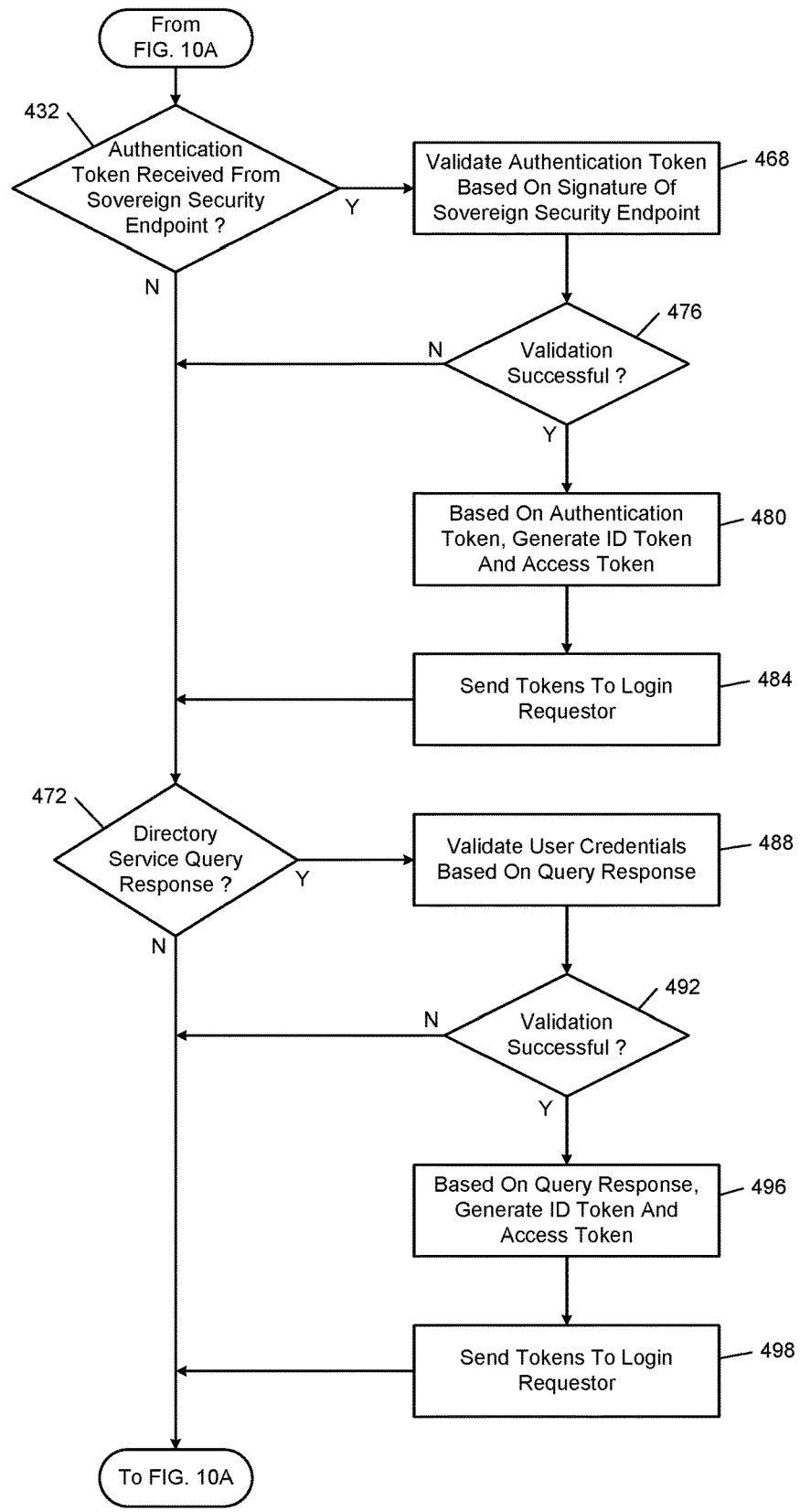

FIG. 10A and FIG. 10B together form a flowchart of example process of a public security endpoint according to the principles of the present disclosure. Control begins at 404, where if a login request has been received, control transfers to 408; otherwise, control transfers to 412. At 408, if the user name associated with the login request is known, such as if the login request included the user name, control transfers to 416; otherwise, control transfers to 420.

At 420, control obtains the user name and continues at 416. Control may obtain the user name by displaying a user interface dialog on the client device that requested the login. At 416, control sends a lookup request to the directory service associated with the public security endpoint. The lookup request includes the domain name of the user and may include the entire user name. Control then continues at 424.

At 412, if a discovery request has been received, control transfers to 408; otherwise, control continues at 424. At 424, if control has received a response to a directory service lookup request, control transfers to 428; otherwise, control continues at 432 in FIG. 10B. At 428, from the lookup response, control extracts the identity of the security endpoint corresponding to the domain name of the user. For example, the identity of the security endpoint may have been determined according to a mapping such as is shown in FIG. 9. The identity of the security endpoint may be a fully qualified domain name, an internet protocol (IP) address, etc.

Control continues at 436, where if the pending request to which the directory service responded is a login request, control transfers to 440; otherwise, if the pending request is a discovery request, control transfers to 444. At 440, control determines whether the extracted identity matches the identity of the public security endpoint where this control is operating (referred to as "localhost"). For example, this match may be performed using a string match between the fully qualified domain name of the security endpoint identified by the lookup response and the fully qualified domain name of the public security endpoint currently executing this control.

If the extracted identity matches the current security endpoint, control transfers to 448; otherwise, the extracted identity matches that of a sovereign security endpoint and control transfers to 452. At 452, control redirects the client device that sent the login request to the address of the sovereign security endpoint. For example, control may send a fully qualified domain name to the client device and the client device can perform a DNS lookup to identify an IP address of the sovereign security endpoint. Control then continues at 432 in FIG. 10B.

At 448, control requests user credentials from the client device. For example, these user credentials include a password or other form of authentication and may include multiple factors. Control continues at 456, where control sends a user query to the directory service. The user query includes the name of the user, which may be in the form of a UPN. Control then continues at 432.

At 440, control determines whether the extracted identity from the lookup response matches the public security endpoint operating the control. If so, control transfers to 460; otherwise, control transfers to 464. At 460, control sends a discovery response to the source of the discovery request indicating that the user is a sovereign user—in other words, the user is associated with a sovereign cloud. The discovery response may include an identifier of which sovereign cloud the user is associated with. This identifier may be in the form of a fully qualified domain name indicating the location of the sovereign security endpoint of the associated sovereign cloud. Control then continues at 432.

At 464, control sends a discovery response to the source of the discovery request indicating that the user is a public user. In other words, the discovery response indicates that the user is associated with the public cloud in which the public security endpoint operates. Then control continues at 432 of FIG. 10B.

At 432 of FIG. 10B, control determines whether or not an authentication token has been received from a sovereign security endpoint. If so, control transfers to 468; otherwise, control continues at 472. At 468, control validates the authentication token based on the signature attached to the authentication token by the sovereign security endpoint. For example, control may verify that the signature was created by the private key of a public-private key pair, where the public key of the sovereign security endpoint is known to the public security endpoint.

Control continues at 476 where, if validation is successful, control transfers to 480. If validation is not successful, control may perform error handling, such as sending an error message and/or writing information to a log, and continues at 472. At 480, based on the authentication token, control generates an ID token indicating the identity of the user and an access token indicating resources the user is authorized to access and operations the user is authorized to perform. At 484, control sends the tokens to the source of the login request.

At 472, if a query response has been received from the directory service, control transfers to 488; otherwise, control returns to 404 of FIG. 10A. At 488, control validates the received user credentials based on the query response. For example, control may compare a salted hash of a password entered at the client device to a salted hash of the user password contained in the query response.

At 492, if the validation is successful, control transfers to 496; otherwise, error reporting and/or logging is performed and control continues at 404 of FIG. 10A. At 496, based on the query response, control generates an ID token indicating the identity of the user and an access token indicating access for which the user is authorized. At 498, control sends the token to the source of the login request. Control then continues at 404 of FIG. 10A.

Resource Access

Figure 11:
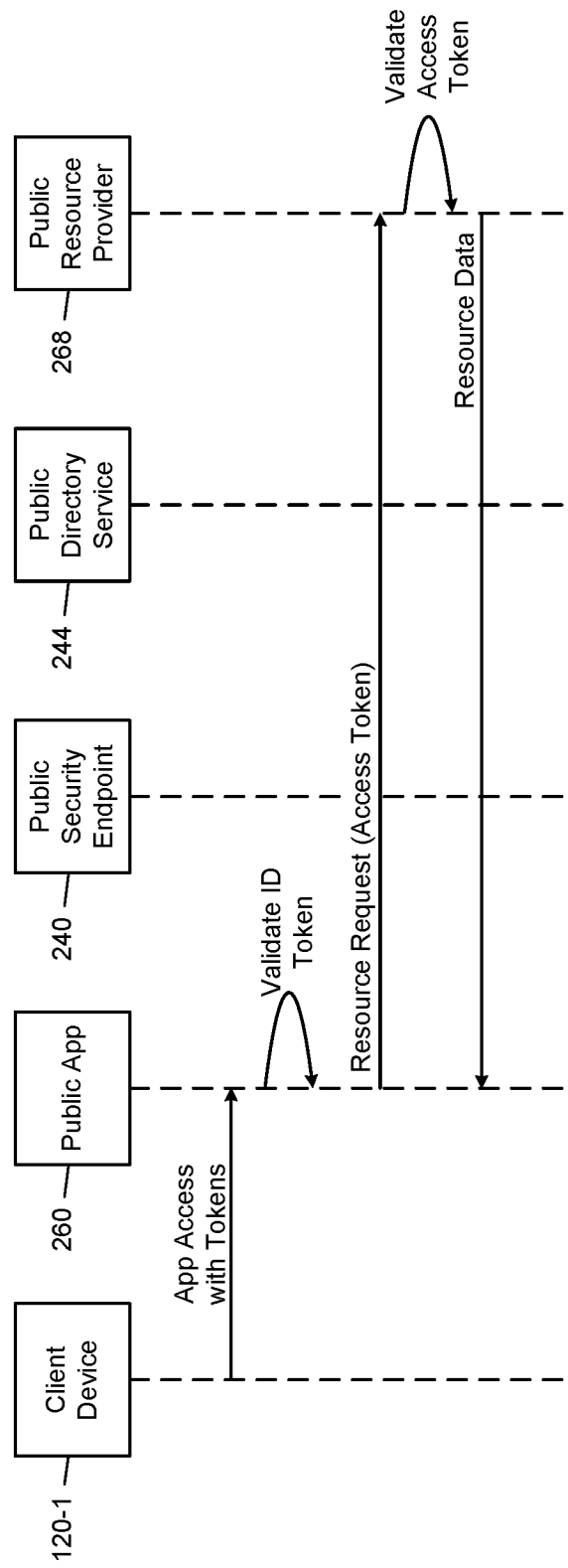
FIG. 11 is a message sequence chart of access by a client device to the resources of a public resource provider.

FIG. 11 is a message sequence chart of access to a public resource provider. The client device 120-1 has acquired tokens, such as by logging in according to one of the procedures described above. The client device 120-1 accesses the public application 260 using the one or more tokens. The public application 260 validates the ID token to verify the identity of the user of the client device 120-1.

When the public application 260 needs to access the resource (such as the user's calendar, mail, or chat history), the public application 260 sends a resource request to the public resource provider 268. The resource request includes the access token provided by the client device 120-1. The public resource provider 268 validates the access token and, if the resource request is consistent with the level of access indicated by the access token, provides the requested resource data to the public application 260. The resource request is not limited to reading data but can also include modifying data and writing new data.

Figure 12:
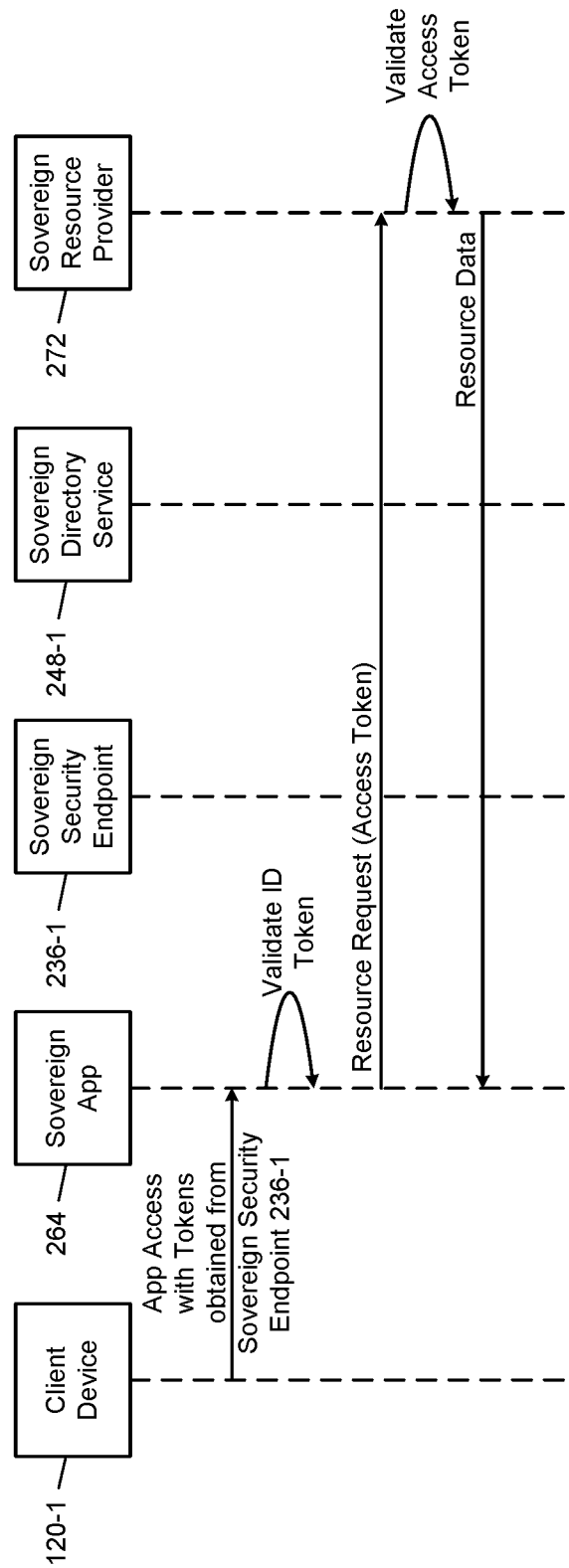
FIG. 12 is a message sequence chart of access by a client device to the resources of a sovereign resource provider.

FIG. 12 is a message sequence chart of access by a client device to the resources of a sovereign resource provider. The client device 120-1 accesses the sovereign application 264 using tokens, which may be obtained according to the processes described above. The sovereign application 264 validates the ID token provided by the client device 120-1 to verify the identity of the user of the client device 120-1.

When the sovereign application 264 has reason to access resources corresponding to the user of the client device 120-1, the sovereign application sends a resource request to the sovereign resource provider 272. The resource request includes the access token from the client device 120-1. The sovereign resource provider 272 validates the access token and, consistent with the level of access indicated by the access token, responds to the sovereign application 264 with the resource data requested. In a situation where the resource request is a write request, the sovereign resource provider 272, consistent with the level of access indicated by the access token, performs the write and may send back an acknowledgement to the sovereign application 264.

Sovereign Applications

Figure 13:
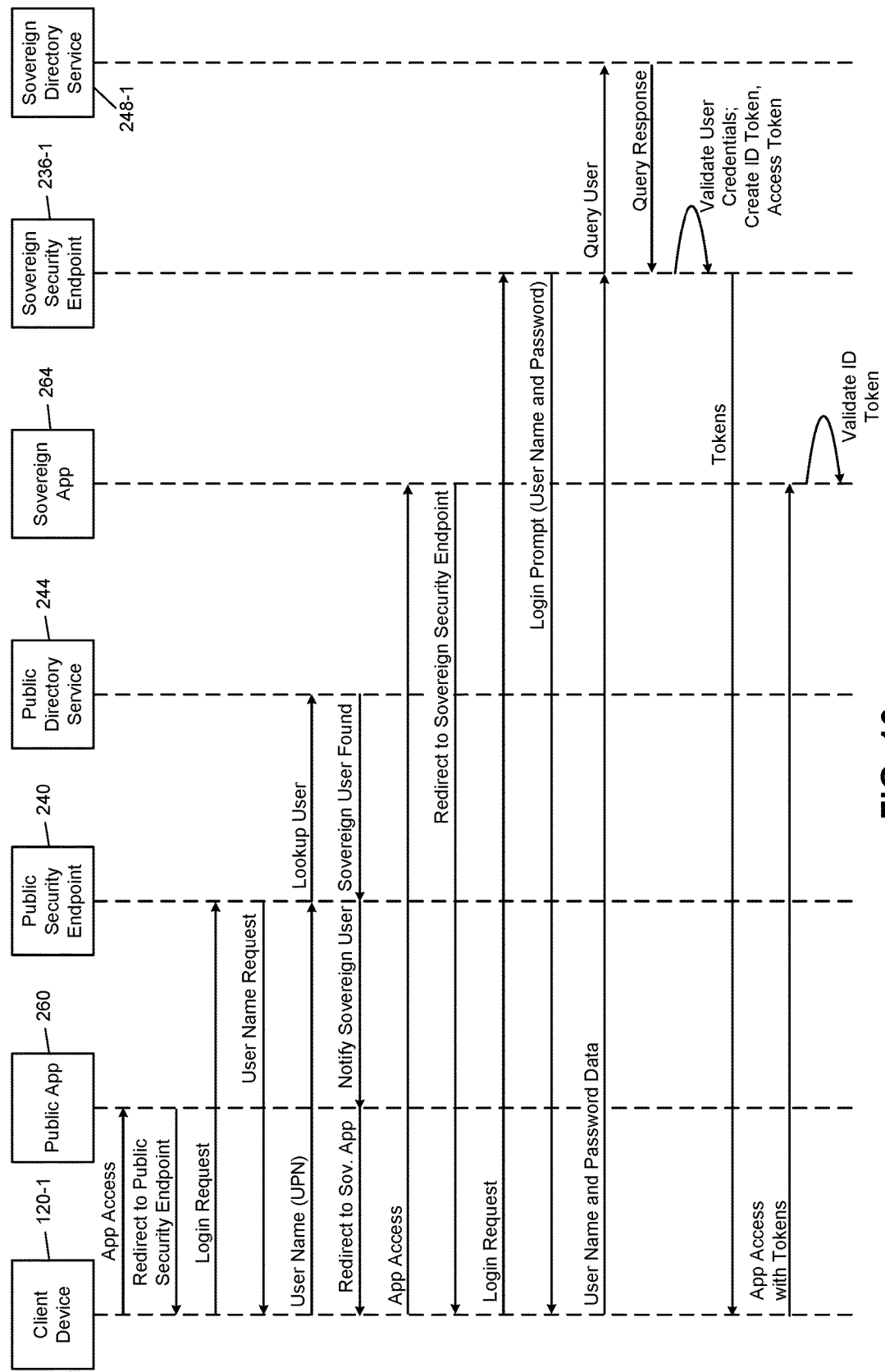
FIG. 13 is a message sequence chart demonstrating redirection to a sovereign application in the case where the user belongs to a sovereign cloud.

FIG. 13 is a message sequence chart demonstrating redirection to a sovereign application for a sovereign user. When a developer deploys a public application, the developer may also deploy one or more sovereign editions of the application that can access data stored within the respective sovereign clouds. According to some architectures, a public application (that is, an application operating within the public cloud) is technologically prevented from accessing data within the sovereign cloud, regardless of permissions established by the sovereign cloud tenants or users.

As a result, in order to use data in a sovereign cloud, a sovereign edition of the application may be deployed within the sovereign cloud. In architectures where there are multiple sovereign clouds, the developer of the public application may deploy an edition of the sovereign application to each sovereign cloud in which the developer plans to seek customers. In FIG. 13, the public application 260 redirects the user to the sovereign application 264 once the public application 260 recognizes the user as being sovereign. Meanwhile, in FIG. 14, the public application 260 facilitates sign-on by the user of the client device 120-1 before then redirecting the client device 120-1 to the sovereign application 264.

In FIG. 13, the client device 120-1 accesses the public application 260. The public application 260 redirects the client device 120-1 to the public security endpoint 240 to perform a login. As described, in other implementations, the public application 260 may request the user name and use that user name as the basis of a discovery request. According to FIG. 13, the client device 120-1 makes a login request to the public security endpoint 240 in response to the redirection.

The public security endpoint 240 requests the user name from the client device 120-1 and the client device 120-1 responds with the user name. The user name may be expressed in the UPN format. The public security endpoint 240 performs a user lookup by consulting the public directory service 244. Because the public directory service 244 determines that the user is associated with the sovereign cloud, the public directory service 244 indicates to the public security endpoint 240 that the user is associated with a sovereign cloud. The public security endpoint 240 notifies the public application 260 that the user is associated with the sovereign cloud.

If the public application 260 is aware of the sovereign application 264, the public application 260 redirects the client device 120-1 to the sovereign application 264. The public application 260 may be referred to as a multi-cloud-aware application in such an instance. If the public application 260 is not aware of other clouds, the public security endpoint 240 instead may directly instruct the client device 120-1 to redirect to the sovereign application 264.

The client device 120-1 accesses the sovereign application 264, which redirects the client device 120-1 to the sovereign security endpoint 236-1. The client device 120-1 sends a login request to the sovereign security endpoint 236-1, which presents a graphical user interface (such as a login dialog) to the client device 120-1 to solicit the user name and password of the user. The client device 120-1 provides the user name and data related to the password to the sovereign security endpoint 236-1. For example, the data related to the password may be a salted hash of the password.

The sovereign security endpoint 236-1 sends a user query to the sovereign directory service 248-1. The sovereign directory service 248-1 sends a query response, which may include authentication data and authorization data. Based on the authentication data, the sovereign security endpoint 236-1 validates the supplied user credentials and creates an ID token indicating the identity of the user of the client device 120-1. The sovereign security endpoint 236-1 also creates an access token based on the authorization indicated by the sovereign directory service 248-1.

The sovereign security endpoint 236-1 transmits the tokens to the client device 120-1 and may redirect the client device 120-1 to the sovereign application 264. The client device 120-1 accesses the sovereign application 264 using those tokens. The sovereign application 264 validates the ID token to establish the identity of the user of the client device 120-1. The public resource provider 268 may need to be multi-cloud-aware to recognize the access token created by the sovereign security endpoint 236-1.

Figure 14:
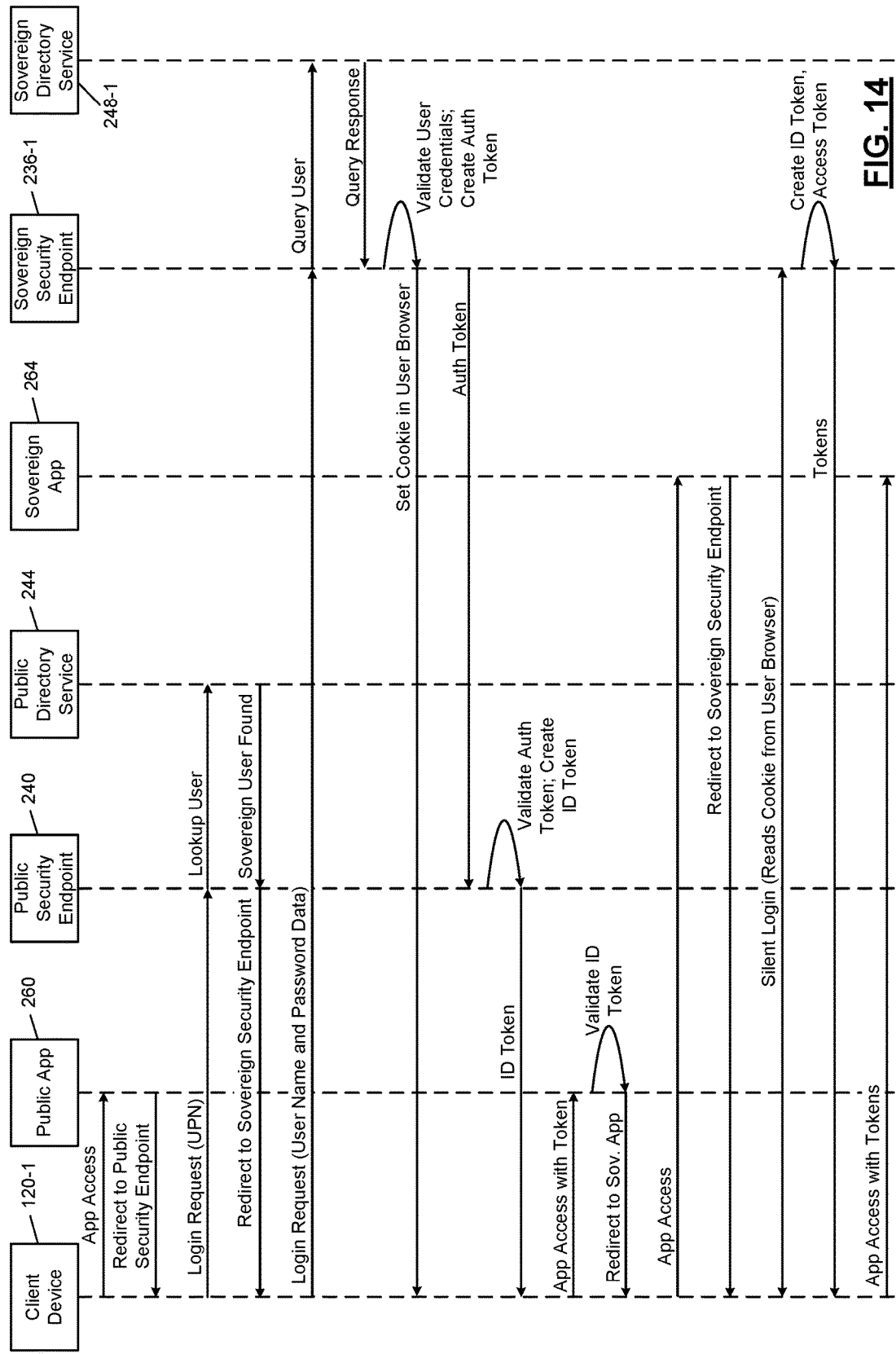
FIG. 14 is a message sequence chart demonstrating single-sign-on to a sovereign application in the case where the user belongs to a sovereign cloud.

In FIG. 14, the client device 120-1 accesses the public application 260, which redirects the client device 120-1 to the public security endpoint 240. The client device 120-1 sends a login request to the public security endpoint 240. The login request may include the user name in UPN format. If not included in the login request, the public security endpoint 240 may solicit the user name from the client device 120-1.

The public security endpoint 240 looks up the user in the public directory service 244. In response to determining that the user is associated with the sovereign cloud, the public directory service 244 indicates to the public security endpoint 240 that the user is a sovereign cloud user.

The public security endpoint 240 redirects the client device 120-1 to the sovereign security endpoint 236-1 to federate the login process. Based on the redirection, the client device 120-1 sends a login request to the sovereign security endpoint 236-1. The login request may include the user name and password data; alternatively, the sovereign security endpoint 236-1 may solicit that data.

The sovereign security endpoint 236-1 queries the sovereign directory service 248-1 on behalf of the user. The sovereign directory service 248-1 returns a response, which the sovereign security endpoint 236-1 uses to validate the supplied user credential. The sovereign security endpoint 236-1 provides persistent data to the client device 120-1, such as by setting a cookie in the web browser of the client device 120-1. This will allow the sovereign security endpoint 236-1 to recognize the client device 120-1 in future connections.

The sovereign security endpoint 236-1 also creates an authentication token and provides that authentication token to the public security endpoint 240. The public security endpoint 240 validates the authentication token and creates an ID token. The public security endpoint 240 sends the ID token to the client device 120-1, which uses the ID token to access the public application 260. The public application 260 validates the ID token and, based on data within the ID token, redirects the client device 120-1 to the sovereign application 264.

The client device 120-1 accesses the sovereign application 264, which redirects the client device 120-1 to the sovereign security endpoint 236-1. The client device 120-1 contacts the sovereign security endpoint 236-1, which reads the persistent data from the client device 120-1. In one example, the sovereign security endpoint reads a cookie set within the user's browser. Once the user of the client device 120-1 is identified by the cookie, the sovereign security endpoint 236-1 creates an ID token and an access token based on the prior query response from the sovereign directory service 248-1.

In some implementations, the sovereign security endpoint 236-1 may re-query the sovereign directory service 248-1 to identify what level of access to provide to the client device 120-1. By re-querying the sovereign directory service 248-1, updated authorization and authentication information can be obtained and the necessary storage or state information in the sovereign security endpoint 236-1 can be reduced.

The sovereign security endpoint 236-1 transmits the tokens to the client device 120-1. The client device 120-1 then accesses the sovereign application 264 using the token.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

The invention claimed is:

1. A computer-implemented method for a security endpoint of a non-isolated public cloud computing environment that permits data access in accordance with a non-isolated scope, the method comprising:
   receiving a request related to an application, wherein the application operates in the non-isolated public cloud computing environment, and wherein the request identifies a domain name of a user;
   in response to receiving the request, querying a directory service according to the domain name of the user, wherein the directory service stores a mapping between a plurality of domain names and a plurality of computing environments, wherein the plurality of computing environments includes the non-isolated public cloud computing environment and a plurality of isolated sovereign cloud computing environments, and wherein the plurality of isolated sovereign cloud computing environments restrict data access in accordance with an isolated scope;
   subsequent to querying the directory service, receiving, from the directory service, an indication of a first computing environment of the plurality of computing environments to which the user belongs; and
   in response to receiving the indication of the first computing environment from the directory service, generating and sending a response to allow the user to be authenticated to the application, wherein:

in response to the first computing environment being the non-isolated public cloud computing environment, the response indicates that the user belongs to the non-isolated public cloud computing environment, and in response to the first computing environment being one of the plurality of isolated sovereign cloud computing environments, the response indicates that the user does not belong to the non-isolated public cloud computing environment.

2. The method of claim 1, wherein the security endpoint is a security token service.

3. The method of claim 1, wherein the indication of the first computing environment uniquely identifies the first computing environment.

4. The method of claim 1, wherein the indication of the first computing environment identifies a security endpoint of the first computing environment.

5. The method of claim 4, wherein the indication of the first computing environment specifies a location of the security endpoint of the first computing environment.

6. The method of claim 5, wherein the indication of the first computing environment specifies a fully qualified domain name of the security endpoint of the first computing environment.

7. The method of claim 1, wherein, in response to the first computing environment being one of the plurality of isolated sovereign cloud computing environments, the response includes the indication of the first computing environment.

8. The method of claim 1, wherein:
the request is a discovery request received from the application by the security endpoint; and
the response is a discovery response transmitted to the application by the security endpoint.

9. The method of claim 1, wherein:
the request identifies a user principal name (UPN) of the user, and
the domain name of the user is a substring of the UPN.

10. The method of claim 1, wherein the mapping further maps each domain name in the plurality of domain names to a corresponding cloud environment to which said each domain name belongs.

11. The method of claim 1, wherein the method further includes:
synchronizing data included in the mapping, wherein the data is synchronized between a first tenant domain data store of the directory service and a second tenant domain data store, which is located within a particular isolated sovereign cloud computing environment included in the plurality of isolated sovereign cloud computing environments, such that both the first tenant domain data store and the second tenant domain data store include a full copy of the data included in the mapping.

12. A security endpoint of a non-isolated public cloud computing environment that permits data access in accordance with a non-isolated scope, the security endpoint comprising:
a computer-readable storage device configured to store computer-executable instructions; and
a processing device configured to execute the computer-executable instructions, which upon execution by the processing device, control the security endpoint to perform:

receiving a request related to an application, wherein the application operates in the non-isolated public cloud computing environment, and wherein the request identifies a domain name of a user;

in response to receiving the request, querying a directory service according to the domain name of the user, wherein the directory service stores a mapping between a plurality of domain names and a plurality of computing environments, wherein the plurality of computing environments includes the non-isolated public cloud computing environment and a plurality of isolated sovereign cloud computing environments, and wherein the plurality of isolated sovereign cloud computing environments restrict data access in accordance with an isolated scope;

subsequent to querying the directory service, receiving, from the directory service, an indication of a first computing environment of the plurality of computing environments to which the user belongs; and in response to receiving the indication of the first computing environment from the directory service, generating and sending a response to allow the user to be authenticated to the application, wherein:

in response to the first computing environment being the non-isolated public cloud computing environment, the response indicates that the user belongs to the non-isolated public cloud computing environment, and in response to the first computing environment being one of the plurality of isolated sovereign cloud computing environments, the response indicates that the user does not belong to the non-isolated public cloud computing environment.

13. The security endpoint of claim 12, wherein the security endpoint is a security token service.

14. The security endpoint of claim 12, wherein the indication of the first computing environment uniquely identifies the first computing environment.

15. The security endpoint of claim 12, wherein the indication of the first computing environment identifies a security endpoint of the first computing environment.

16. The security endpoint of claim 15, wherein the indication of the first computing environment specifies a location of the security endpoint of the first computing environment.

17. The security endpoint of claim 16, wherein the indication of the first computing environment specifies a fully qualified domain name of the security endpoint of the first computing environment.

18. The security endpoint of claim 12, wherein the computer-executable instructions, when executed by the processing device, control the security endpoint to perform further steps including, in response to the first computing environment being one of the plurality of isolated sovereign cloud computing environments, including the indication of the first computing environment in the response.

19. The security endpoint of claim 12, wherein:
the request is a discovery request received from the application by the security endpoint; and
the response is a discovery response transmitted to the application by the security endpoint.

20. The security endpoint of claim 12, wherein:
the request identifies a user principal name (UPN) of the user, and
the domain name of the user is a substring of the UPN.

* * * * *